(12) United States Patent
Inoue

(10) Patent No.: US 7,077,424 B2
(45) Date of Patent: Jul. 18, 2006

(54) HEAD PROTECTING AIRBAG DEVICE

(75) Inventor: Michio Inoue, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 306 days.

(21) Appl. No.: 10/453,644

(22) Filed: Jun. 4, 2003

(65) Prior Publication Data
US 2003/0230878 A1 Dec. 18, 2003

(30) Foreign Application Priority Data
Jun. 17, 2002 (JP) .............................. 2002-176154
Dec. 25, 2002 (JP) .............................. 2002-375109

(51) Int. Cl.
*B60R 21/16* (2006.01)

(52) U.S. Cl. .............................. 280/730.2; 280/743.1; 280/749

(58) Field of Classification Search .............. 280/730.2, 280/749, 743.1
See application file for complete search history.

(56) References Cited

U.S. PATENT DOCUMENTS

| 6,293,581 B1 | 9/2001 | Saita et al. | |
| 6,705,636 B1* | 3/2004 | Takahara | 280/728.2 |
| 6,722,693 B1* | 4/2004 | Ikeda et al. | 280/730.2 |
| 6,866,293 B1* | 3/2005 | Ogata | 280/730.2 |
| 2004/0070184 A1* | 4/2004 | Takahara | 280/730.2 |
| 2004/0130129 A1* | 7/2004 | Takahara | 280/730.2 |

FOREIGN PATENT DOCUMENTS

| DE | 101 38 546 | 8/2000 |
| DE | 20105734 | 4/2001 |
| JP | A-2001-233153 | 8/2001 |

\* cited by examiner

*Primary Examiner*—Eric Culbreth
(74) *Attorney, Agent, or Firm*—Posz Law Group, PLC

(57) ABSTRACT

A head protecting airbag device comprises an airbag and a gas feeder member. The airbag includes a main portion, an inlet port and a plurality of mounting portions. The inlet port is connected above an intermediate pillar portion to a gas feeder so as to admit inflating gas downward into a gas receiving portion of the main portion. The mounting portions are composed of a vicinity mounting portion arranged close to the inlet port, and general mounting portions. A recess is formed between the vicinity mounting portion and the inlet port. This recess substantially enlarges the length of the outer peripheral edge of the vicinity mounting portion facing the inlet port and the outer peripheral edge of the inlet port facing the vicinity mounting portion, thereby increasing the possible separation of the vicinity mounting portion and the inlet port.

6 Claims, 30 Drawing Sheets

HEAD PROTECTING AIRBAG DEVICE

The present application claims priority to Japanese patent application of Inoue, filed Jun. 17, 2002, No. 2002-176154, and Japanese patent application of Inoue, filed Dec. 25, 2002, No. 2002-375109, the entirely of each is hereby incorporated into the present application by this reference.

BACKGROUND OF THE INVENTION

1. Field of the Invention

The present invention relates to a head protecting airbag device to be mounted on a vehicle. More specifically, the invention relates to a head protecting airbag device, in which an inlet port of an airbag to be connected to a gas feeder member for feeding inflating gas is positioned above an intermediate pillar portion arranged between a front pillar portion and a rear pillar portion of the vehicle.

2. Description of the Related Art

A head protecting airbag device of this kind is disclosed in DE 20105734 U1. In this head protecting airbag device, an inlet port for introducing the inflating gas downward into the airbag is arranged above the portion in the airbag midway in the longitudinal direction of the vehicle so as to admit the inflating gas downward into the airbag.

To this inlet port of the airbag, moreover, there is connected a gas feeder member for feeding the inflating gas. This gas feeder member consists of an inflator for generating the inflating gas and a feed pipe joined to the inflator. The gas feeder member has rigidity, it being a rod-shaped member arranged in the longitudinal direction of the vehicle. In the vicinity of one end of the gas feeder member, there are arranged gas discharge ports for discharging the inflating gas. These gas discharge ports are so opened in the lower face side of the gas feeder member as to discharge the inflating gas downward.

However, the head protecting airbag device of the aforementioned construction has the following problems when the inlet port of the airbag is arranged above the intermediate pillar portion arranged between the front pillar portion and the rear pillar portion of the vehicle.

In the airbag, more specifically, a plurality of mounting portions for mounting the airbag on the vehicular body have to be arranged near the upper edge of the airbag at the time when the airbag is completely inflated. Especially, a mounting portion has to be arranged close to the inlet port so that the vicinity of the inlet port will not greatly vibrate or come out when the airbag admits the inflating gas ("vicinity mounting portion").

During the actual operation of the head protecting airbag device, however, an impact may be applied to the side face of the vehicle. When a collision load is applied to the side face of the intermediate pillar portion so that this intermediate pillar portion is largely displaced toward the interior, moreover, the vicinity mounting portion mounting the vicinity of the inlet port of the airbag on the body and the gas discharge ports of the gas feeder member may deviate away from each other one to the interior side and the other to the exterior side. In this case, the inlet port itself may close the gas discharge ports and interrupt the smooth expansion and inflation of the airbag.

On the other hand, the airbag to be used in the head protecting airbag device of the aforementioned construction has a construction as disclosed in JP-A-2001-233153. This airbag is constructed by hollow-weaving, and the outer peripheral edge portion to be arranged on the outer circumference of the gas receiving portion is by 3×3 diagonal weave.

In the airbag thus disclosed, however, the outer peripheral edge portion is wholly 3×3 diagonally woven. In other words, no consideration has been taken of the portion of the outer peripheral edge portion in which stress concentration easily occurs when the airbag is inflated, such as an inner corner portion which is recessed to receive tension in the expanding direction when the airbag is inflated. In case the inflator used has a high output capacity, therefore, stress may concentrate at the inner corner portion at the time of inflating the airbag, and the airbag may be damaged.

SUMMARY OF THE INVENTION

A first object of the invention is to provide a head protecting airbag device, in which an airbag has an inlet port for admitting inflating gas above an intermediate pillar so that the smooth expansion and inflation of the airbag can be assured even if the intermediate pillar portion is largely displaced toward the interior.

A second object of the invention is to provide an airbag, which can be smoothly inflated without receiving significant damage even if a stress is concentrated at one place during inflating.

The first object of the invention can be achieved by a head protecting airbag device having the following construction:

A head protecting airbag device comprising:

an airbag folded and housed above an intermediate pillar portion arranged between a front pillar portion and a rear pillar portion of a vehicle, for covering, when inflated, the interior side of the intermediate pillar portion and windows to the front and rear of the intermediate pillar portion; and a gas feeder member formed in a rigid rod shape to be arranged in the longitudinal direction of the vehicle, and having a gas discharge port formed near one end for discharging inflating gas, wherein the airbag includes: a main portion having a gas receiving portion which receives the inflating gas and inflates; an inlet port connected to the gas feeder member; and a plurality of mounting portions for mounting the airbag on a body of the vehicle, wherein the main portion can cover, when completely inflated, the interior side of the intermediate pillar portion and the windows, wherein the inlet port is arranged above the intermediate pillar portion and on the upper edge of the main portion when the main portion is inflated, so as to protrude upward and thus introduce the inflating gas downward into the gas receiving portion, wherein the mounting portions are arranged near the upper edge of the main portion when the main portion is inflated so as to protrude upward, wherein the mounting portions in the airbag includes a vicinity mounting portion arranged close to the inlet port, and other general mounting portions, wherein a downward recess is formed between the vicinity mounting portion and the inlet port, and wherein the recess can substantially enlarge the length of the outer periphery of the vicinity mounting portion facing the inlet port and the outer periphery of the inlet port facing the vicinity mounting portion, thereby to increase the separation of the vicinity mounting portion and the inlet port from each other, one moving toward the interior side or the exterior side.

In the actual operation of the head protecting airbag device thus constructed, the inflating gas flows from the gas discharge ports of the gas feeder member into the inlet port and further into the main portion of the airbag so that the airbag is inflated to cover the interior side of the intermediate pillar portion and the front and rear windows of the intermediate pillar portion. At this time, the airbag is smoothly inflated without its portion near the inlet port being vertically vibrated. This is because the vicinity mounting portion arranged near the inlet port is mounted together with the remaining general mounting portions on the body.

In the head protecting airbag device thus constructed, moreover, between the vicinity mounting portion and the inlet port, there is formed a downward recess for substantially enlarging the length of the outer periphery of the vicinity mounting portion facing the inlet port and the outer periphery of the inlet port facing the vicinity mounting portion. Even if the intermediate pillar portion is displaced during the actual operation toward the interior side by an impact from the exterior so that the vicinity mounting portion mounting the vicinity of the inlet port of the airbag and the gas discharge ports of the gas feeder member separate, one toward the interior side and the other toward the exterior side, therefore, it is possible to enlarge the relative deviations of the vicinity mounting portion and the inlet port away from each other, one moving toward the interior side or the exterior side. Unlike the case in which the downward recess is not formed between the vicinity mounting portion and the inlet port, therefore, the head protecting airbag device thus constructed enables the inlet port to follow the relative displacement of the gas discharge ports to some extent, by extending both the outer periphery of the vicinity mounting portion facing the inlet port and the outer periphery of the inlet port facing the vicinity mounting portion to be on one flat plane. Thus, the gas discharge ports are prevented from being clogged by the inlet port to the greatest extent possible. As a result, the inflating gas discharged from the gas discharge ports flows without any trouble into the gas receiving portion of the airbag through the inlet port. Thus, the airbag can be smoothly inflated.

In the head protecting airbag device thus constructed, therefore, the airbag is provided with an inlet port for admitting the inflating gas formed above the intermediate pillar portion, in a manner that its smooth expansion and inflation can be assured even if the intermediate pillar portion is largely displaced toward the interior.

Moreover, the first object of the invention can also be achieved by a head protecting airbag device having the following construction:

A head protecting airbag device comprising:

an airbag folded and housed above an intermediate pillar portion arranged between a front pillar portion and a rear pillar portion of a vehicle, for covering, when inflated, the interior side of the intermediate pillar portion and windows to the front and rear of the intermediate pillar portion; and a gas feeder member formed in a rigid rod member to be arranged in the longitudinal direction of the vehicle, and having a gas discharge port formed near one end for discharging inflating gas, wherein the airbag includes: a main portion having a gas receiving portion to be inflated by admitting the inflating gas; an inlet port connected to the gas feeder member; and a plurality of mounting portions for mounting the airbag on the body side, wherein the main portion can cover, when completely inflated, the interior side of the intermediate pillar portion and the windows, wherein the inlet port is so arranged at the portion above the intermediate pillar portion and on the upper edge of the main portion when inflated as to protrude upward, thereby to introduce the inflating gas downward into the gas receiving portion, wherein the mounting portions are arranged on the upper edge of the main portion when inflated so that the mounting portions to protrude upward, wherein the mounting portions in the airbag includes a vicinity mounting portion arranged in the vicinity of the inlet port, and other general mounting portions, and wherein the vicinity mounting portion, the inlet port and the gas feeder member are offset from the center of the line in the longitudinal direction of the vehicle extending over the intermediate pillar portion, toward either the front or the rear of the vehicle.

In the head protecting airbag device thus constructed, the ordinary operations are similar to those of the foregoing head protecting airbag device. Moreover, the vicinity mounting portion, the inlet port and the gas feeder member are integrally displaced toward the interior when the intermediate pillar portion is actually displaced toward the interior by impact from the exterior. This is because the vicinity mounting portion, the inlet port and the gas feeder member are arranged offset from the center of the line in the longitudinal direction of the vehicle over the intermediate pillar portion, to the rear or to the front. Therefore, the relative displacement between the vicinity mounting portion and the gas discharge ports can be suppressed to prevent the inlet port from clogging the gas discharge ports. As a result, the inflating gas discharged from the gas discharge ports is introduced without any trouble through the inlet port into the gas receiving portion of the airbag so that the airbag can be smoothly inflated.

In the head protecting airbag device of the aforementioned construction, therefore, the airbag also includes the inlet port above the intermediate pillar portion for introducing the inflating gas, so that the smooth expansion and inflation of the airbag can be retained even if the intermediate pillar portion is largely displaced toward the interior side.

Moreover, the second object of the invention can be achieved by an airbag having the following construction:

An hollow-woven airbag folded and housed in a vehicle for being inflated by admitting inflating gas from an inflator, comprising:

a gas receiving portion which when inflated separates two wall portions; and a non-inlet portion constructed by joining two wall portions and adapted to admit no inflating gas, wherein the non-inlet portion is arranged on the peripheral edge of the gas receiving portion and forms the outer peripheral edge of the airbag, wherein the outer peripheral edge portion includes an inner corner portion having a recessed shape for receiving tension in the widening direction when the airbag is inflated, and wherein the inner corner portion is formed of a woven texture, in which it is more extendible than the other portions of the outer peripheral edge portion.

In the airbag thus constructed, the inner corner portion, which is recessed to receive tension in the widening direction when the airbag is inflated, is so woven that it may be more extendible than the remaining portions. Even if a stress concentration occurs at that portion when the airbag is inflated, therefore, the inner corner portion itself extends so that it does not readily receive damage. In the airbag of the aforementioned construction, moreover, the outer peripheral edge portion is not wholly formed of an extendible woven texture, and the other portions are only slightly extended. Therefore, the shape of the airbag having completed its inflation can be made like that of the related art and thus retain the predetermined protective area.

Therefore, the airbag of the aforementioned construction is not readily damaged and can be smoothly inflated, even if stress concentration occurs when it is inflated.

In the airbag of the aforementioned construction, moreover, it is preferable:

that the gas receiving portion includes an inlet port fixed on the body of the vehicle to introduce the inflating gas, and a main portion adapted to be inflated by admitting the inflating gas from the inlet port; and that the inner corner portion is arranged at a boundary portion between the inlet port and the main portion.

In the airbag thus constructed, higher stress is easily concentrated near the boundary portion between the inlet port fixed on the body and the main portion when the airbag is inflated. In the airbag of this construction, however, the inner corner portion, which is formed of a woven texture more extendible than that of the other portions, is arranged at the boundary portion between the inlet port and the main portion. Therefore, the stress can be absorbed even if it is concentrated at the boundary portion between the inlet port and the main portion, by the cushioning of the inner corner portion.

In the airbag of the aforementioned construction, moreover, it is preferable:

that the inlet port is formed and bent to protrude from the main portion; and that the inner corner portion is arranged on the inner peripheral side of the bent portion.

In the airbag thus constructed, the inlet port is bent to protrude from the main portion, so that increased stress is easily concentrated at the inner portion near the boundary portion between the inlet port and the main portion when the airbag is inflated. In the airbag of this construction, however, the inner corner portion, which is formed of a woven texture more extendible than that of the remaining portion, is arranged at the boundary portion between the inlet port and the main portion. Therefore, the stress can be absorbed, even if concentrated at that portion, by the cushioning of the inner corner portion.

In the airbag of the aforementioned construction, moreover, it is preferable:

that a generally circular arc-shaped cutaway portion is formed in the recessed outer peripheral edge of the inner corner portion.

With the airbag being thus constructed, even if stress pulling in the widening direction acts on the inner corner portion when the airbag is inflated, the actual length of the thin inner corner portion can be enlarged, thereby suppressing the stress concentration.

DESCRIPTION OF THE PREFERRED EMBODIMENTS

Figure 1:
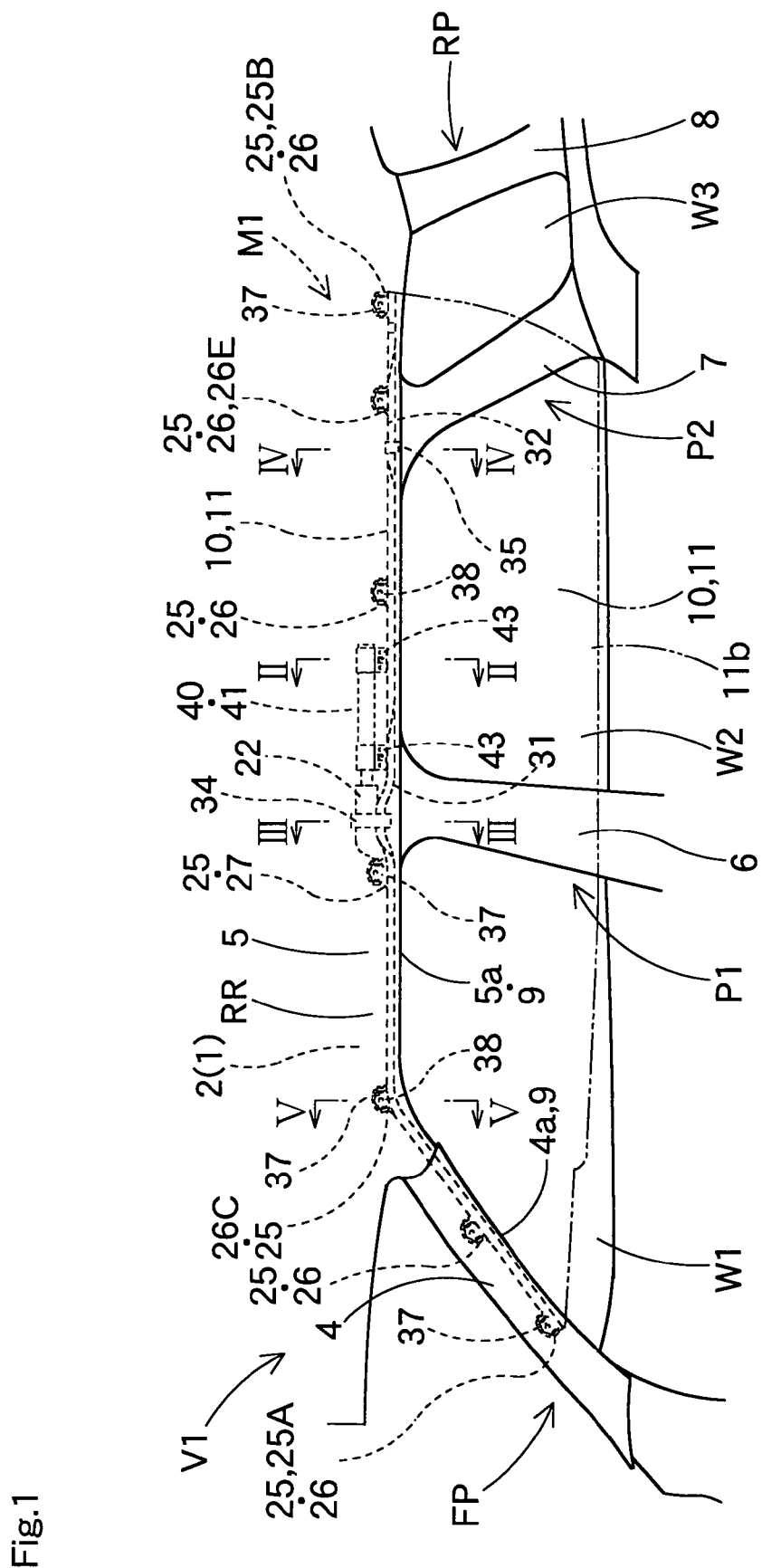
FIG. 1 is a front elevation, as taken from the interior side of a vehicle, of a head protecting airbag device according to a first embodiment of the invention.

The invention will be described below by way of embodiments shown in the drawings. In addition, the invention is not limited to the embodiments. All modification within the requirements of the claims and equivalents with respect to the requirements should be included in the scope of the claims.

One embodiment of the invention will be described with reference to the accompanying drawings.

Below are described head protecting airbag devices M1/M2, which can achieve the first object of the invention. The head protecting airbag device M1 of the first embodiment is mounted on a front pillar portion FP and a roof side rail portion RR on the upper edge of the windows (side windows) W1/W2/W3 of a vehicle V1, as shown in FIG. 1. Here in this vehicle V1, a first intermediate pillar portion P1 and a second intermediate pillar portion P2 are arranged between the front pillar portion FP and a rear pillar portion RP.

As shown in FIGS. 1 to 5, the head protecting airbag device M1 is provided with an airbag 10, clamps 34/35, mounting brackets 37/43 and a gas feeder member 40. The head protecting airbag device M1 is housed while being covered with an airbag cover 9, when it is mounted on the vehicle V1. In the case of the embodiment, the airbag cover 9 is constructed from a lid 4a on the lower edge of a front pillar garnish 4 for covering the vehicular interior side of the front pillar portion FP, and a lid 5a on the lower edge of a roof head lining 5 for covering the vehicular interior side of the roof side rail portion RR.

Figure 2:
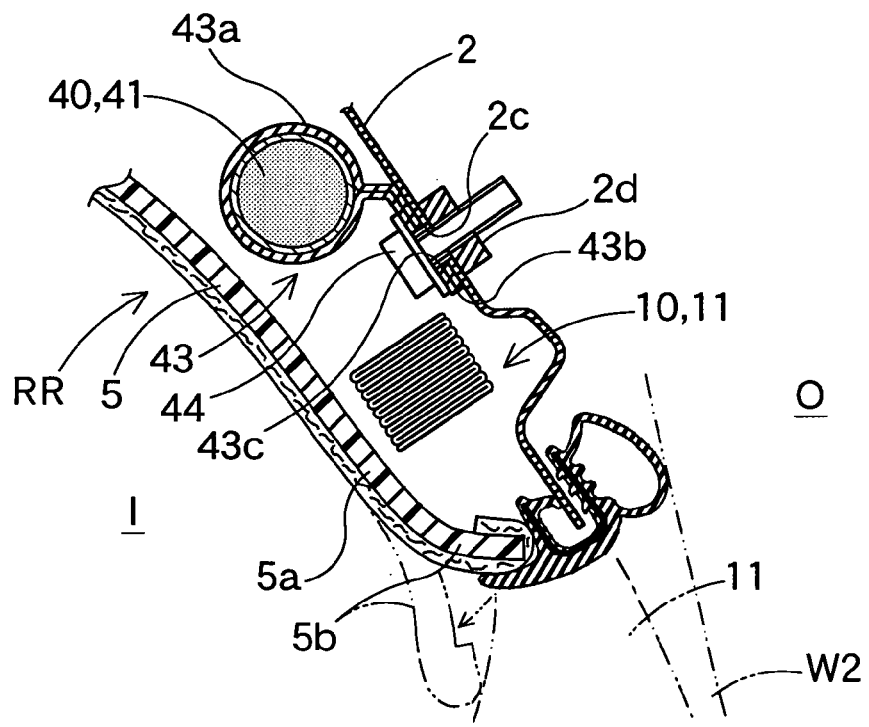
FIG. 2 is an enlarged schematic section of portion II—II of FIG. 1.
Figure 3:
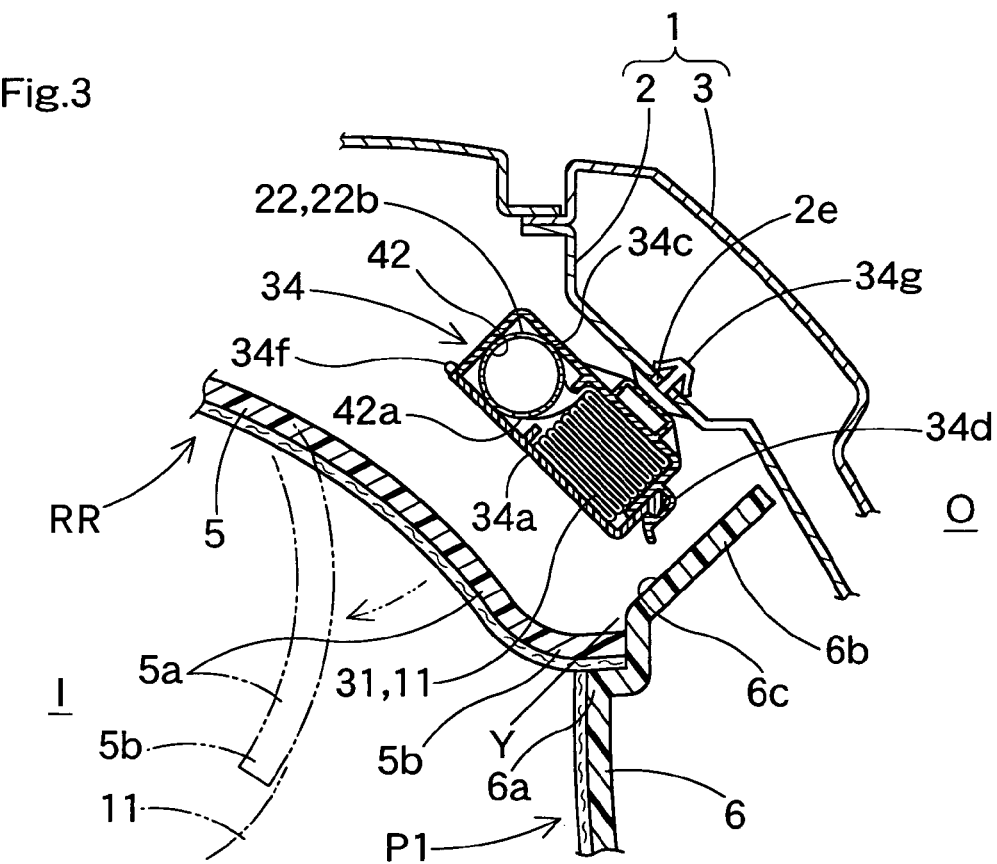
FIG. 3 is an enlarged schematic section of portion III—III of FIG. 1.
Figure 4:
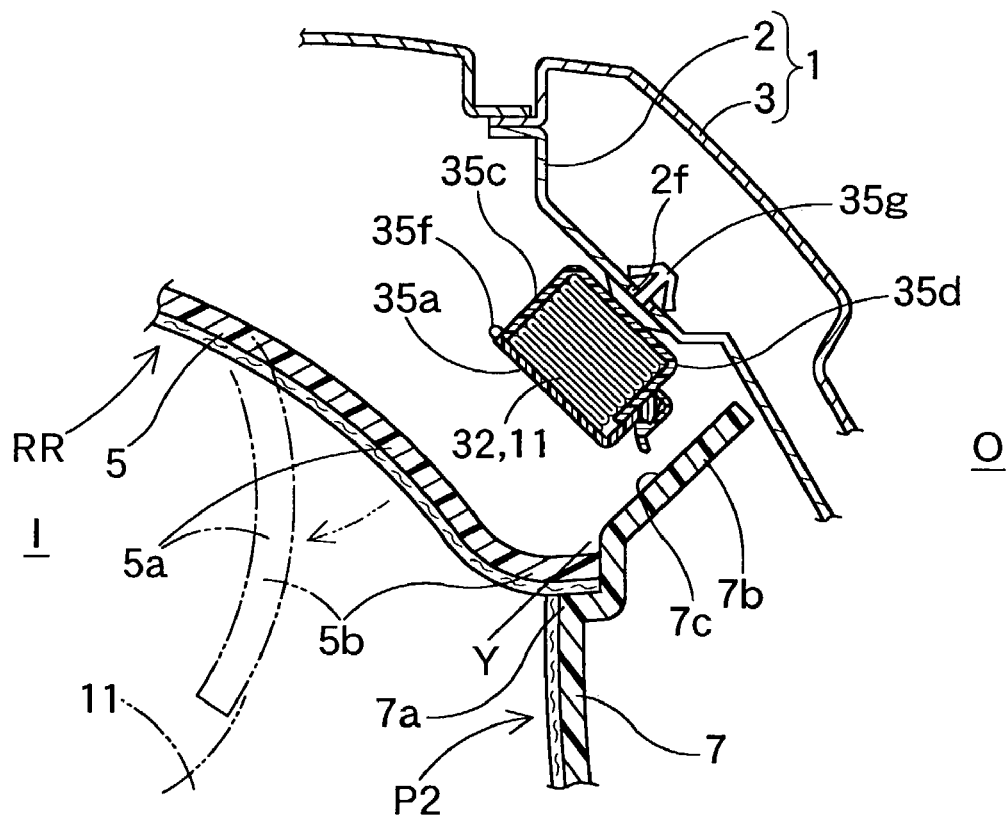
FIG. 4 is an enlarged schematic section of portion IV—IV of FIG. 1.

The roof head lining 5 is made of a synthetic resin and is mounted on the inner panel 2 of the vehicle body (body) 1, to the interior side I of the roof side rail portion RR, by not-shown mounting means, as shown in FIGS. 1 to 5. The lid 5a on the lower edge 5b of the roof head lining 5 is opened toward the interior side I so as to allow the main portion 11 of the airbag 10 to protrude when inflated. Here in the first/second intermediate pillar portions P1/P2, the lower end 5b of the lid 5a catches on the upper ends 6a/7a on the interior side I of pillar garnishes 6/7 covering the interior side I of the pillar portions P1/P2, as shown in FIGS. 1, 3 and 4.

At the upper ends of the garnishes 6/7 on a vehicular exterior side O, as shown in FIGS. 3 and 4, there are arranged guide portions 6b/7b, which are inclined so as to be low on the interior side I and high on the exterior side O. These guide portions 6b/7b are so arranged below the folded main portion 11 of the airbag 10 as to guide the main portion 11 to be smoothly rolled out, when inflated, to the interior side I. The guide portions 6b/7b have upper faces 6c/7c formed so that their extensions Y to the exterior side O are positioned above the upper ends 6a/7a of the garnishes 6/7 on the interior side I.

The front pillar garnish 4 is made of a synthetic resin and is mounted on the inner panel 2 of the body 1 on the interior side I of the front pillar portion FP. The lid 4a of the garnish 4 is also opened toward the interior side I so as to allow the main portion 11 of the airbag 10 to protrude when inflated.

The gas feeder member 40 feeds inflating gas to the folded airbag 10. The gas feeder member 40 is formed into a rigid rod shape by assembling a diffuser 42 with a cylinder type inflator 41, as shown in FIGS. 1 to 3 and FIGS. 6 to 8. The inflator 41 is activated by a side collision of the vehicle V1 to release the inflating gas. The diffuser 42 is attached to the leading end (or the front end in the shown embodiment) of the inflator 41. The diffuser 42 is made of a generally cylindrical metal pipe having a closed leading end, and is joined to the leading end of the inflator 41 by caulking its base edge. In the lower face near the leading end of the diffuser 42, there are opened two gas discharge ports 42a, which are lined up in the longitudinal direction of the vehicle V1.

Further, the gas feeder member 40 is mounted on the inner panel 2 of the body 1 by means of the mounting brackets 43 and mounting bolts 44 with the diffuser 42 caulked and joined to the leading end of the inflator 41. The gas feeder member 40 is arranged in the longitudinal direction of the vehicle V1. Each mounting bracket 43 is made of a metal and is provided with a clamp portion 43a and a plate mounting portion 43b, as shown in FIG. 2. Each clamp portion 43a clamps the inflator 41 at each of the two longitudinal ends. In each mounting portion 43b, there is formed mounting holes 43c for inserting the mounting bolts 44. The gas feeder member 40 is fixed on the inner panel 2 of the body 1 in the following manner. With the diffuser 42 assembled with the inflator 41, the inflator 41 is clamped at its front and rear ends by the individual clamp portions 43a. Then, the individual mounting holes 43c are aligned with predetermined mounting holes 2c in the side of the body 1, and the mounting bolts 44 are fastened through the mounting holes 43c/2c in nuts 2d mounted in the circumferential edges of the mounting holes 2c, so that the gas feeder member 40 can be fixed on the inner panel 2.

In the state where the gas feeder member 40 is mounted on the vehicle V1, as shown in FIG. 3, the individual gas discharge ports 42a of the diffuser 42 are offset toward the interior side I, away from the upper end 6a of the garnish 6. Moreover, the individual gas discharge ports 42a are so arranged as to discharge the inflating gas downward in the vertical direction.

Here, this gas feeder member 40 is mounted in the airbag assembly 30 (FIGS. 7 and 8) on the vehicle V1 with the gas feeder member 40 and the airbag 10 connected.

As shown in FIG. 1, the airbag 10 is housed in its folded state in the roof side rail portion RR extending from the front pillar portion FP over the first/second intermediate pillar portions P1/P2 to the upper vicinity of the window W3. Moreover, the airbag 10 covers, when inflated, the interior sides I of the windows W1/W2 to the front/rear of the first intermediate pillar portion P1, the window W3 between the second pillar portion P2 and the rear pillar portion RP, and the first/second intermediate pillar portions P1/P2, as indicated by double-dotted lines in FIGS. 1 to 5.

Figure 12:
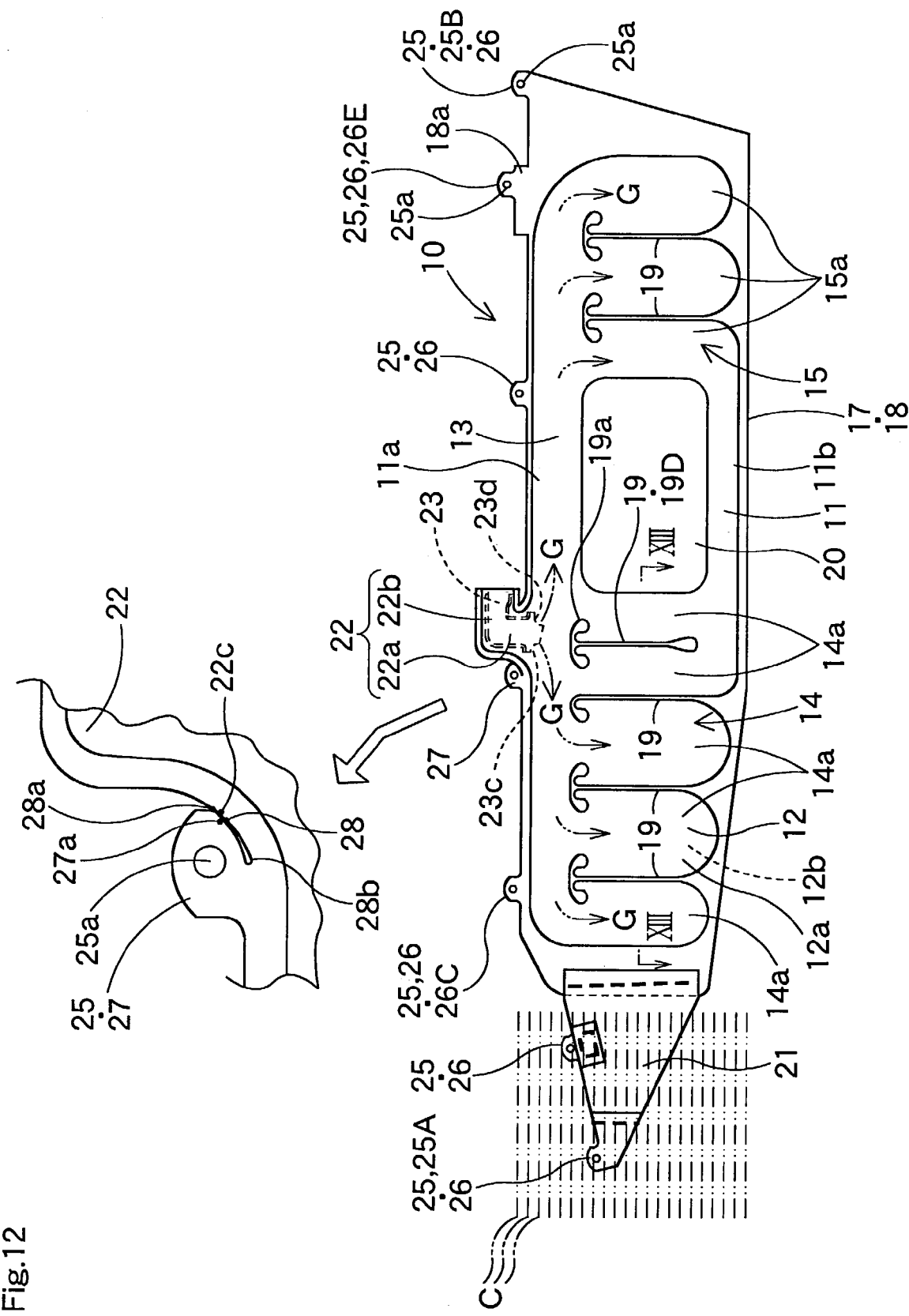
FIG. 12 is a front elevation of the airbag of the first embodiment.
Figure 13:
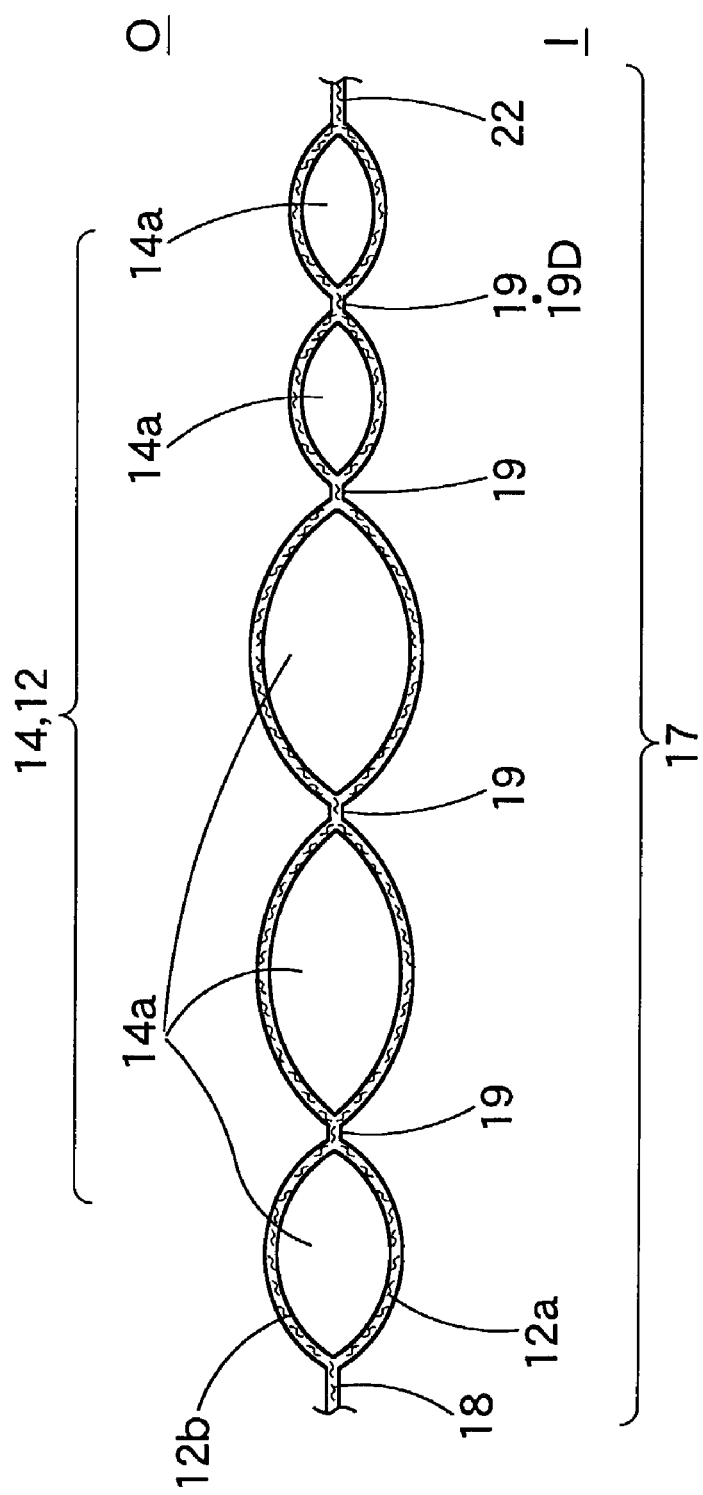
FIG. 13 is a transverse section showing the airbag of the first embodiment inflated and corresponds to portion XIII—XIII of FIG. 12.
Figure 14:
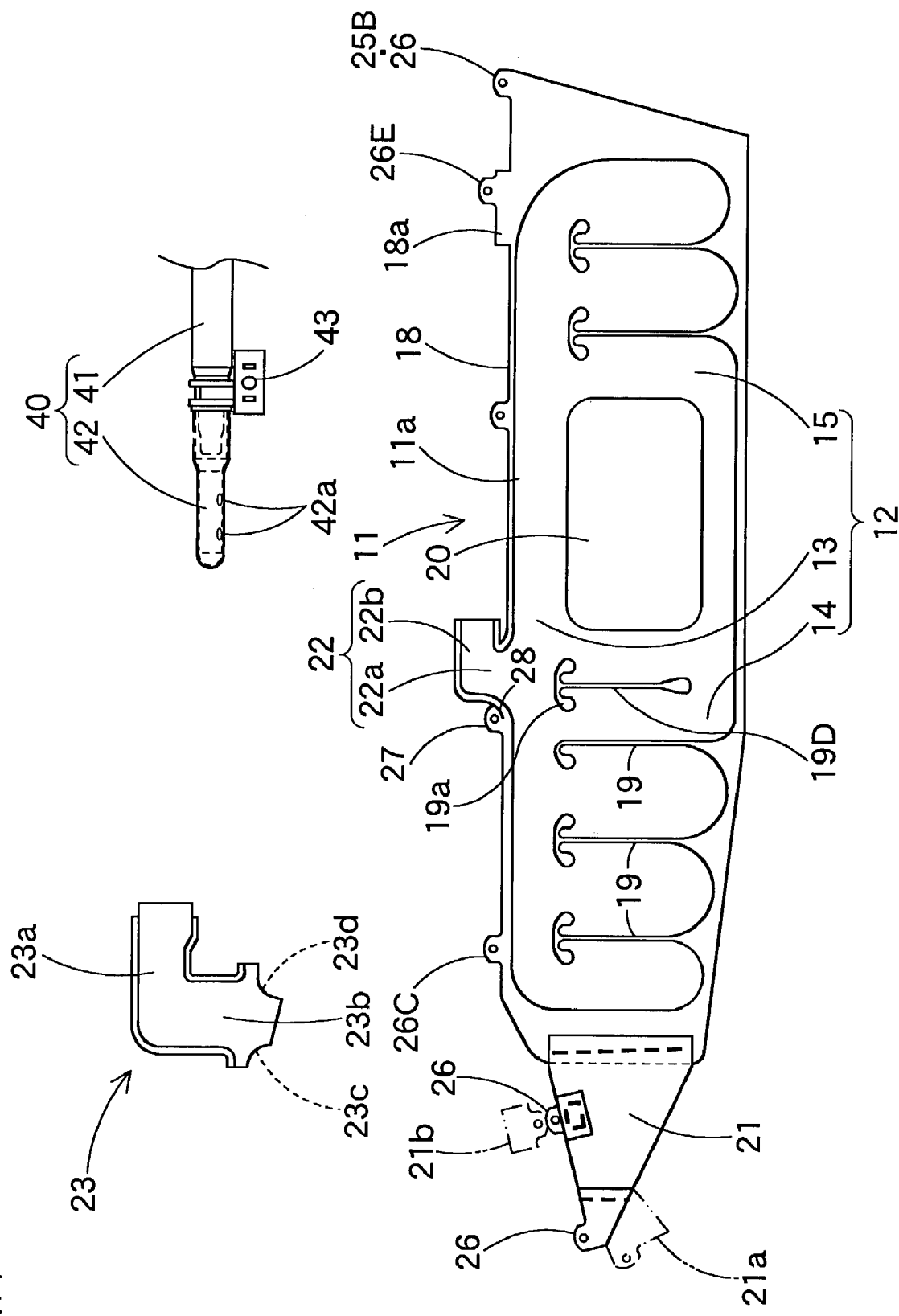
FIG. 14 is a front elevation showing a main portion and a flow regulating fabric of the airbag of the first embodiment.

As shown in FIGS. 12 to 14, moreover, the airbag 10 includes the main portion 11, an inlet port 22 and a plurality of mounting portions 25 for mounting the airbag 10 on the body 1. The main portion 11 can cover, when completely inflated, the interior side I of the intermediate pillar portions P1/P2 and the windows W1/W2/W3. The inlet port 22 is connected to the gas feeder member 40 so that it can pass the inflating gas to the inside of the main portion 11.

The main portion 11 is hollow-woven with polyamide yarns or the like into a flexible bag shape. At this hollow-weaving time, the inlet port 22 and the mounting portions 25 are manufactured integrally with the main portion 11. Moreover, a coating agent such as silicone is applied after the main portion 11 is woven, to the outer surfaces of the main portion 11 and the inlet port 22 so as to improve their heat resistance.

The main portion 11 consists of a gas receiving portion 12 and a gas non-inlet portion 17 which does not allow passage of inflating gas, as shown in FIGS. 12 to 14. The gas receiving portion 12 admits the inflating gas from the gas feeder member 40 and is inflated to separate its interior side wall portion 12a and its exterior side wall portion 12b. The non-inlet portion 17 is formed to join the interior side wall portion 12a and the exterior side wall portion 12b. Here, the main portion 11 is constructed in the case of the embodiment by sewing a cloth member 21 different from the main portion 11 itself to the front end side. The general mounting portions 26, arranged on the cloth member 21, are reinforced with strengthened cloth 21a/21b formed with the cloth member 21 integrally (FIG. 14). However, the portion of that cloth member 21 may also be formed by hollow-weaving it integrally with the main portion 11.

The gas receiving portion 12 is provided with a front inflation portion 14 to be inflated to the side of the exterior side of the front seat, and a rear inflation portion 15 to be inflated to the side of the exterior side of the rear seat. Moreover, the gas receiving portion 12 is provided with a gas feed passage portion 13 arranged in the longitudinal direction of the vehicle V1, on the upper edge 11a of the main portion 11 so as to feed the inflating gas from the inlet port 22 to the front/rear inflation portions 14/15.

The non-inlet portion 17 includes one outer peripheral edge portion 18 arranged around the gas receiving portion 12, regulating portions 19 and a plate portion 20. The regulating portions 19 are arranged in a vertically extending linear shape at a plurality of portions in the regions of the front/rear inflation portions 14/15. These regulating portions 19 are arranged so that the front/rear inflation portions 14/15 may be able to keep the plate shape at the time of the complete inflation, while being prevented from becoming thick at certain areas. These regulating portions 19 are formed into such a T-shape or an inverted J-shape as to extend upward and away from the outer peripheral edge portion 18 on the side of the lower edge 11b of the main portion 11. Here, the front/rear inflation portions 14/15 are divided by the vertically extending regulating portions 19 into a plurality of vertically extending vertical cells 14a/15a. When the individual vertical cells 14a/15a are inflated, moreover, the main portion 11 is shrunk in the longitudinal length size. Therefore, the main portion 11 can establish, when mounted on the vehicle V1, a tension in the longitudinal direction between mounting portions 25A/25B (FIGS. 1 and 12).

The plate portion 20 is arranged in a rectangular shape between the front/rear inflation portions 14/15. This plate portion 20 is arranged to reduce the volume of the gas receiving portion 12 and so shorten the time period from the start to the completion of the inflation of the main portion 11.

The inlet port 22 is arranged in the case of the embodiment at the approximate center of the upper edge 11a in the longitudinal direction of the main portion 11, that is, above the rear end of the front inflation portion 14. The inlet port 22 is formed to protrude upward. Specifically, the inlet port 22 is formed into an inverted L-shape. The inlet port 22 is provided with a vertical cylinder portion 22a extending upward from the gas feed passage portion 13, and a horizontal cylinder portion 22b extending to the rear of the vehicle from the upper end of the vertical cylinder portion 22a. The horizontal cylinder portion 22b is opened at its rear end. The inlet port 22 is mounted on the diffuser 42 of the gas feeder member 40 so as to arrange the two gas discharge ports 42a/42a in the vicinity of the upper position of the vertical cylinder portion 22a. When the inlet port 22 is mounted around the diffuser 42, moreover, it is connected to the diffuser 42 by fastening a clamp 45 made of sheet metal.

Figure 6:
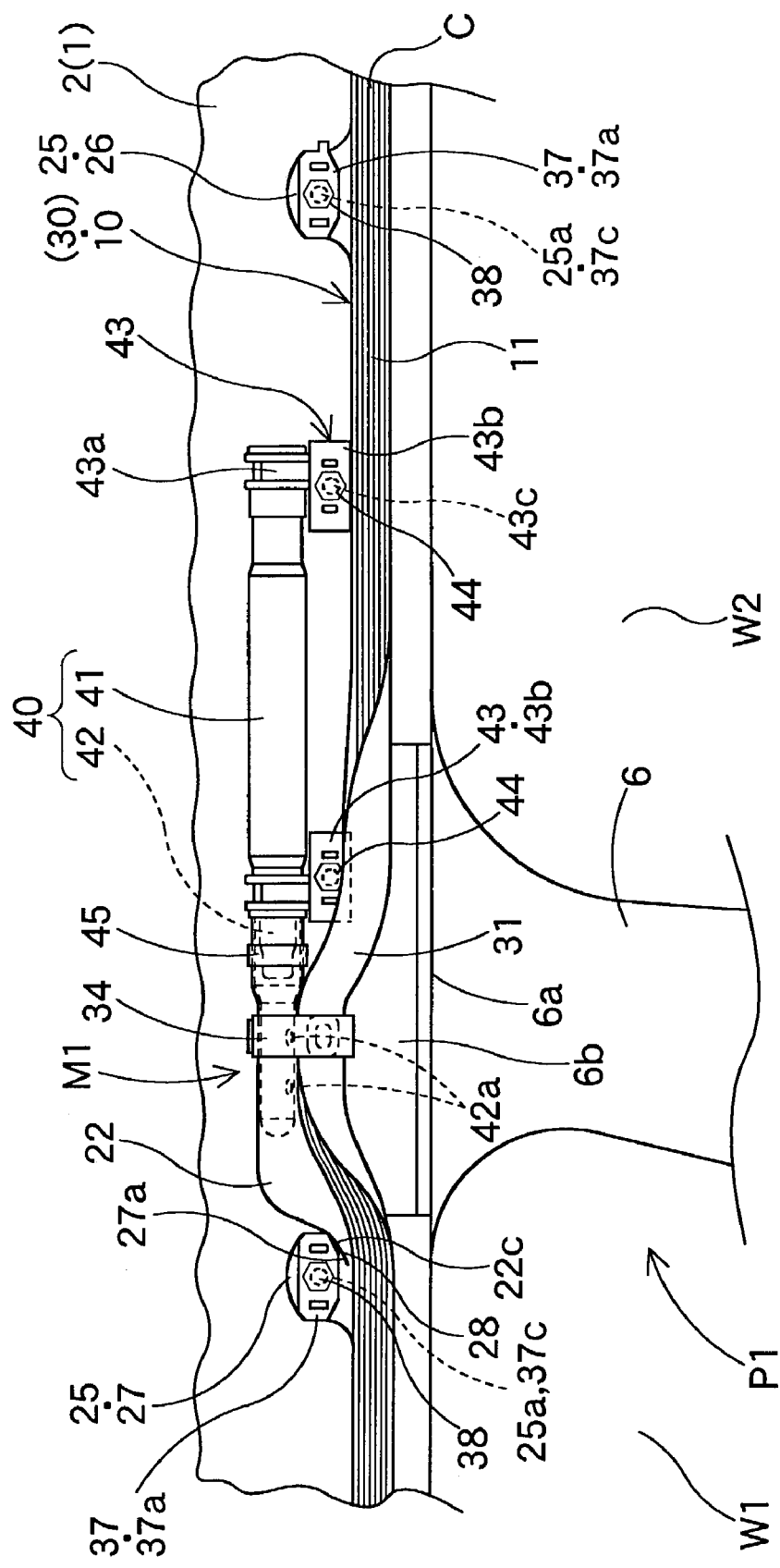
FIG. 6 is a partial front elevation showing the upper vicinity of a first intermediate pillar portion in the head protecting airbag device of the first embodiment, and shows the state in which a roof head lining is omitted.

In the case of the first embodiment, moreover, the inlet port 22 is arranged above the first intermediate pillar portion P1 (as shown in FIGS. 1 and 6).

In the case of the embodiment, moreover, a flow regulating fabric 23 is arranged in the inlet port 22, as shown in FIGS. 12 and 13. This flow regulating fabric 23 is formed of the remaining hollow-woven portion of the main portion 11. The flow regulating fabric 23 is provided with a horizontal cylinder portion 23a arranged in the horizontal cylinder portion 22b of the inlet port 22, and a vertical cylinder portion 23b extending downward from the front end of the horizontal cylinder portion 23a. This horizontal cylinder portion 23a is arranged between the inner circumference of the horizontal cylinder portion 22b of the inlet port 22 and the outer circumference of the diffuser 42. In the lower end of the vertical cylinder portion 23b, moreover, gas outlet ports 23c/23d for discharging the inflating gas are opened obliquely to the front and obliquely to the rear. The gas outlet ports 23c/23d are arranged, when the flow regulating fabric 23 is arranged in the inlet port 22, in the region of the gas feed passage portion 13 of the main portion 11.

Here, the inflating gas G discharged from the gas outlet ports 23c/23d flows into the gas receiving portion 12 of the main portion 11, as shown in FIG. 12. Specifically, the inflating gas G flows forward through the gas feed passage portion 13, while encountering interference from the horizontal rod portions 19a of regulating portions 19D below the inlet port 22, into the individual vertical cells 14a and then inflates the front inflation portion 14. Moreover, the inflating gas G flows to the rear through the gas feed passage portion 13, while encountering interference from the horizontal rod portions 19a of regulating portions 19D, into the rearmost vertical cell 14a of the front inflation portion 14 and the individual vertical cells 15a and then inflates the rear inflation portion 15. As a result, the entire inflation of the main portion 11 is completed. Moreover, the airbag 10 has the inlet port 22 arranged at its approximate center in the longitudinal direction so that it can be promptly fed with the inflating gas G to the front and rear ends of its gas receiving portion 12 and be quickly inflated.

Figure 5:
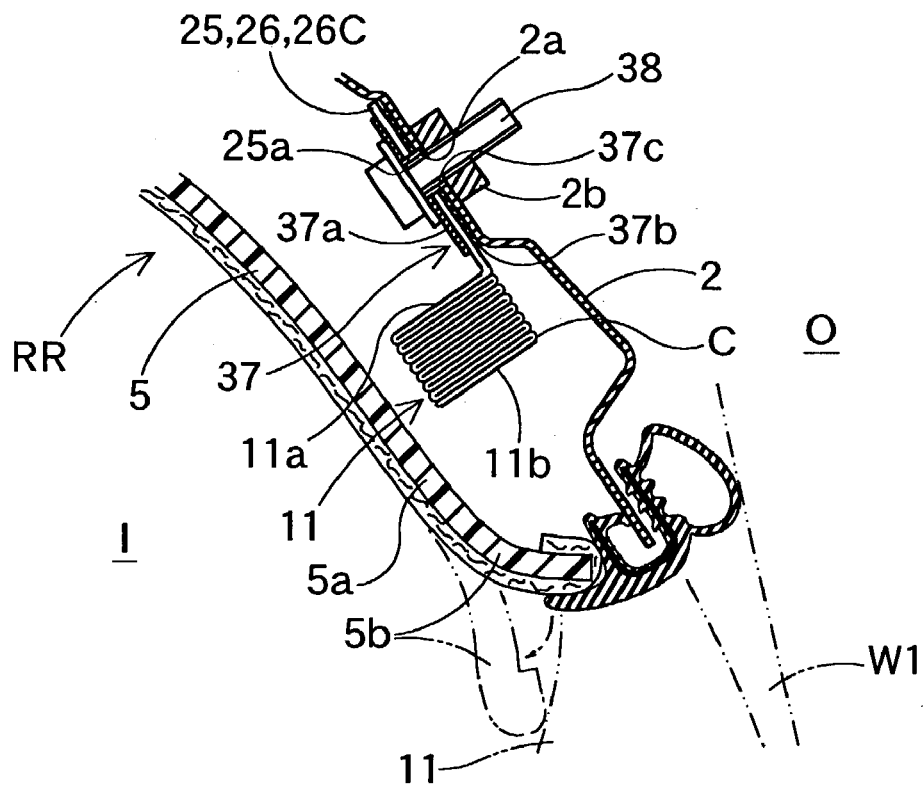
FIG. 5 is an enlarged schematic section of portion V—V of FIG. 1.

Each mounting portion 25 is arranged by the upper edge 11a of the main portion 11 so as to protrude upward when the main portion 11 is inflated. At the center of each mounting portion 25, there is formed a mounting hole 25a. Into each mounting hole 25a, there is inserted a mounting bolt 38 (FIGS. 5 and 6). Each mounting hole 25a is formed by boring it after the main portion 11 is hollow-woven.

On each mounting portion 25, as shown in FIG. 5, there is fixed the mounting bracket 37, which is made of sheet metal. This bracket 37 is provided for mounting the folded main portion 11 firmly on the inner panel 2 on the side of the body 1. Each mounting bracket 37 is made of sheet metal and provided with an inner plate 37a on the interior side I and an outer plate 37b on the exterior side O. The inner/outer plates 37a/37b are mounted on each mounting portion 25 while clamping it. Moreover, the inner/outer plates 37a/37b are provided with mounting holes 37c, so as to align with the mounting hole 25a of each mounting portion 25.

Further, each mounting portion 25 is mounted with the mounting bracket 37 on the inner panel 2 by means of the mounting bolt 38. Each bolt 38 is inserted into the mounting holes 37c/25a and is fastened in a nut 2b, which is fixed on the circumferential edge of the mounting hole 2a of the inner panel 2.

In the case of the first embodiment, moreover, the mounting portions 25 are composed of two kinds: one vicinity mounting portion 27 arranged close to the inlet port 22; and other general mounting portions 26. In the case of the embodiment, the vicinity mounting portion 27 is arranged in the vicinity of the front edge 22c of the inlet port 22.

Figure 7:
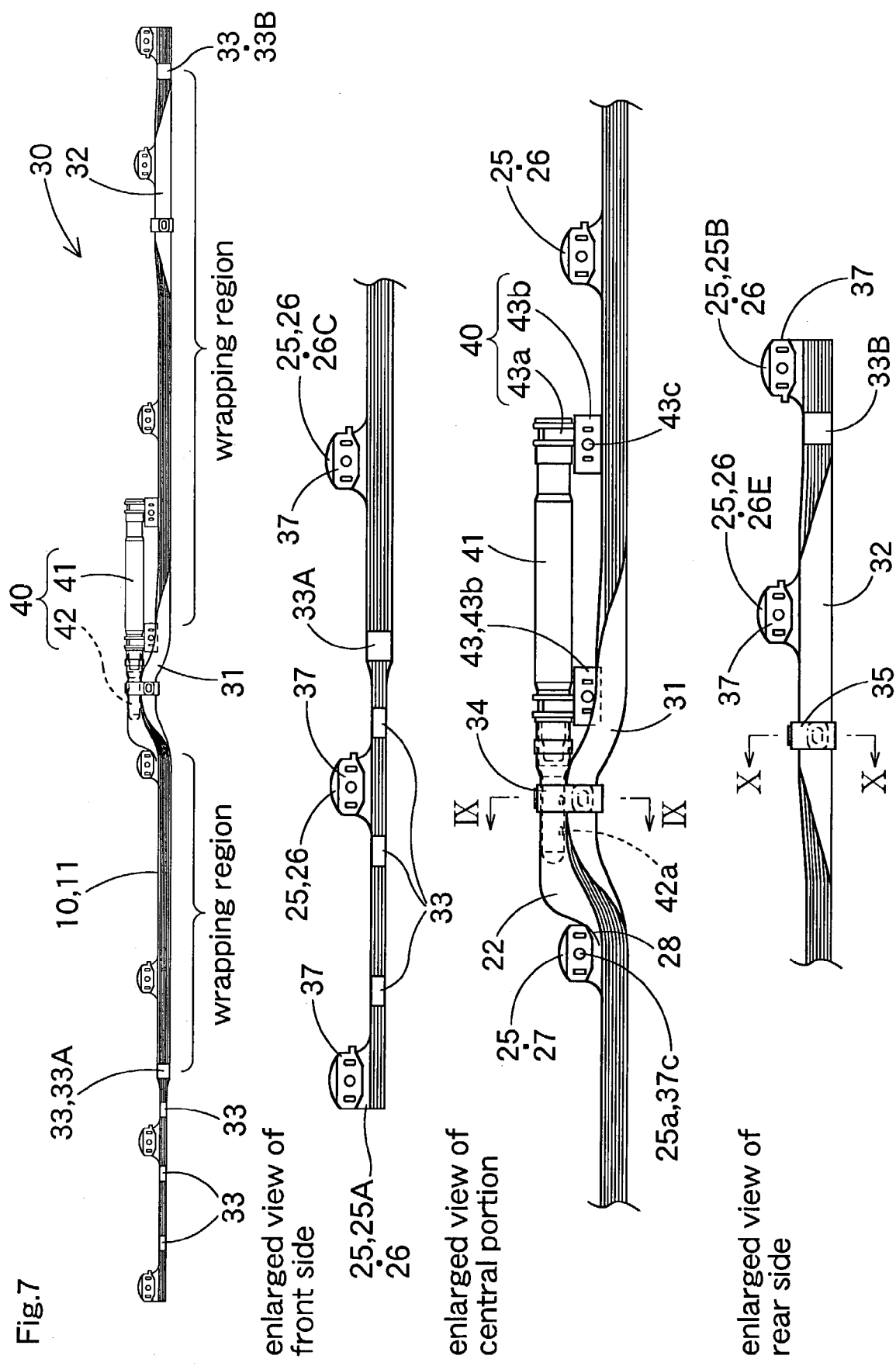
FIG. 7 is a front elevation showing an airbag assembly of the first embodiment.
Figure 15:
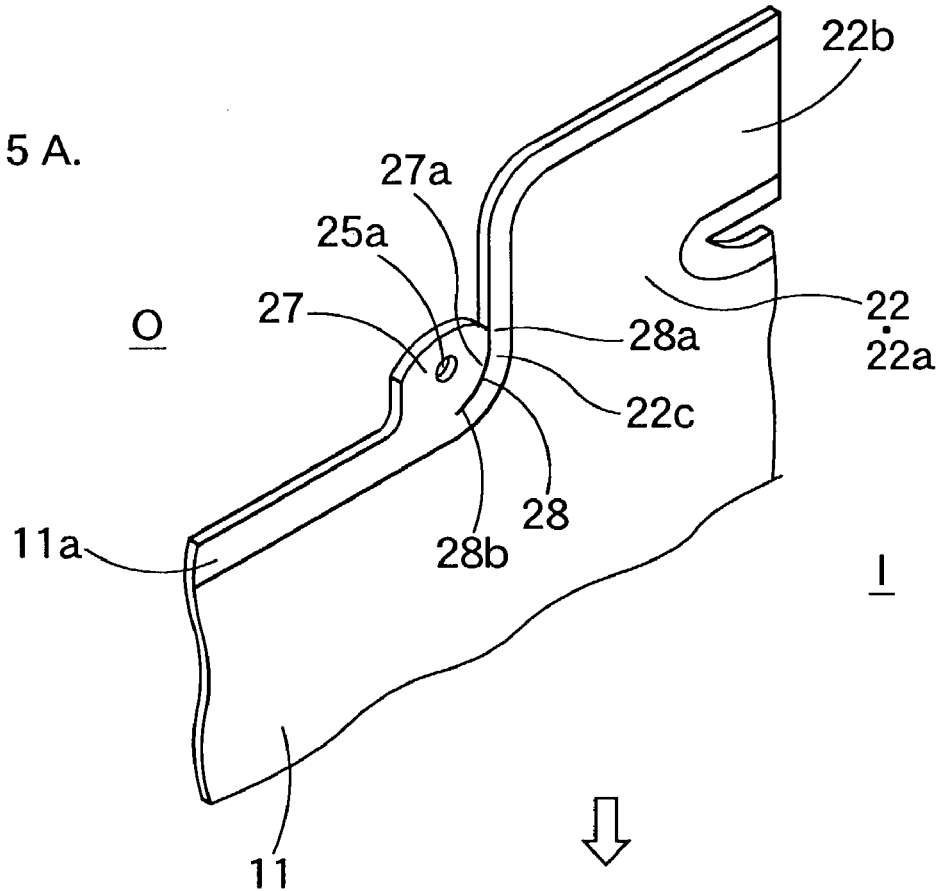
FIG. 15A and FIG. 15B are views for explaining the movement of an inlet port of the airbag of the first embodiment into the vehicular interior side.
Figure 15:
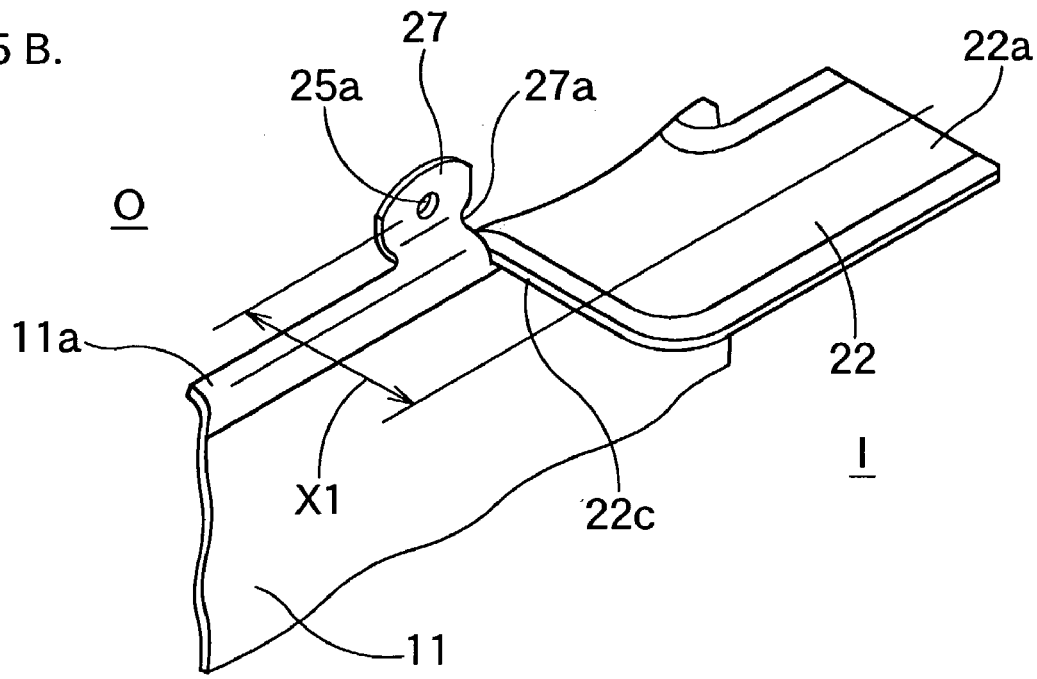
Figure 16:
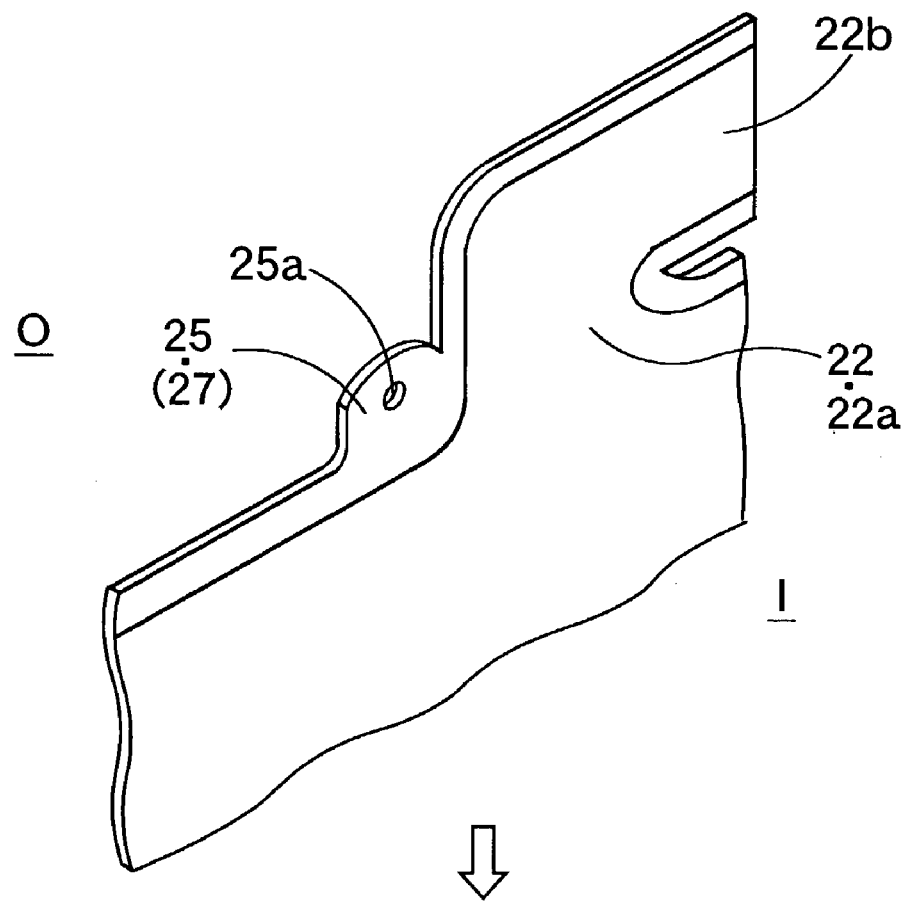
FIG. 16A and FIG. 16B are views for explaining the movement of an inlet port of an airbag of a comparative example into the vehicular interior side.
Figure 16:
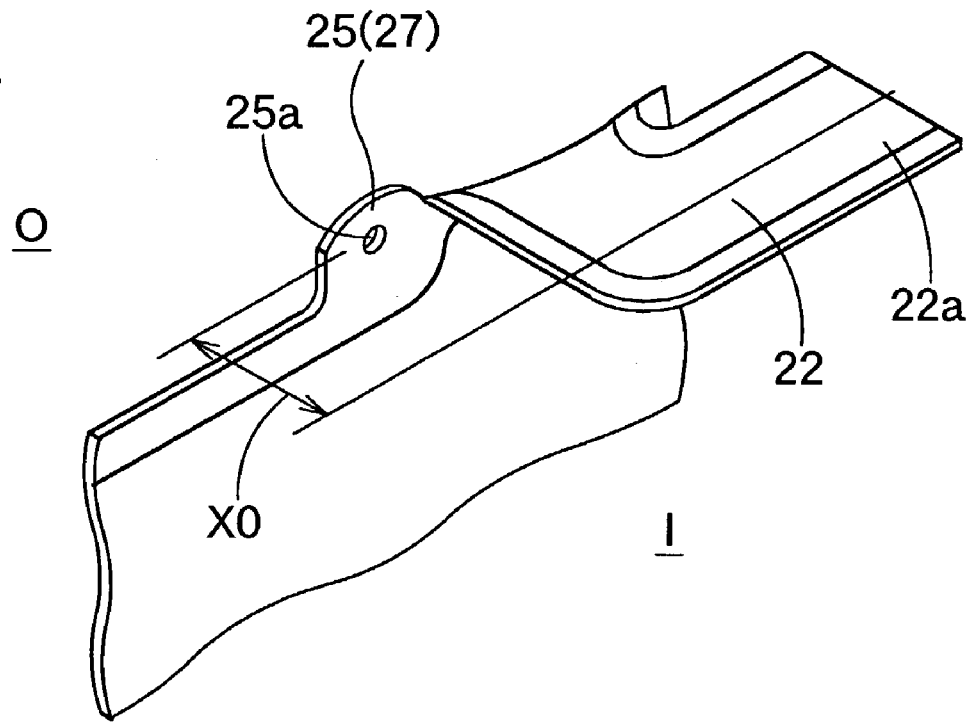

Between the outer peripheral edge 27a of the vicinity mounting portion 27 near the inlet port 22 and the front edge 22c of the inlet port 22, moreover, there is arranged a slit 28, formed to be a downward recess. This slit 28 substantially enlarges the length of the outer peripheral edge 27a of the vicinity mounting portion 27 near the inlet port 22 and the outer peripheral edge 22c of the inlet port 22 near the vicinity mounting portion 27. The slit 28 is arranged at its upper end 28a in the boundary portion between the vicinity mounting portion 27 and the inlet port 22 at the upper edge 11a of the main portion 11 so that it is not held in place by the inner plate 37a of the mounting bracket 37 (FIGS. 6 and 7). Moreover, the slit 28 is extended downward in such a downward recessed curve as to arrange its lower end 28b directly below the mounting hole 25a of the vicinity mounting portion 27. In this vicinity mounting portion 27, more specifically, the slit 28 is formed to open into a point below the mounting hole 25a, in the upper edge 11a of the main portion 11 without encountering any interference from the inner plate 37a. Moreover, the slit 28 substantially enlarges the lengths of the outer peripheral edge 27a of the vicinity mounting portion 27 on the side facing the inlet port 22 and enlarges the outer peripheral edge 22c of the inlet port 22 on the side facing the vicinity mounting portion 27. Even if the circumferential edge of the mounting hole 25a of the vicinity mounting portion 27 is fixed in position while the horizontal cylinder portion 22b of the inlet port 22 moves to the interior I, therefore, the outer peripheral edges 27a/22c extend in a straight line, as shown in FIGS. 15A and 15B. As a result, the distance X1 from the mounting hole 25a of the vicinity mounting portion 27 to the center of the horizontal cylinder portion 22b is elongated. Without the slit 28, as shown in FIG. 16, when the horizontal cylinder portion 22b of the inlet port 22 is moved to the interior side I while the circumferential edge of the mounting hole 25a is fixed in position, the distance X0 from the mounting hole 25a to the center of the horizontal cylinder portion 22b is shorter by the length of the absent slit 28 than the distance X1.

In the case of the first embodiment, moreover, near the general mounting portion 26E located above the second intermediate pillar portion P2, as shown in FIG. 12, the outer peripheral edge portion 18 at the upper edge 11a of the main portion 11 is provided with an upward extension 18a. Further, the general mounting portion 26E is formed to protrude upward from that extension 18a. As shown FIGS. 11A and 11B, the extension 18a is arranged so that even if a twisted portion 32 is formed in the folded main portion 11, the mounting portion 26E located at the twisted portion 32 can be mounted on the main portion 11 at the inner panel 2 at the same height position as the adjoining mounting portion 25B.

Figure 8:
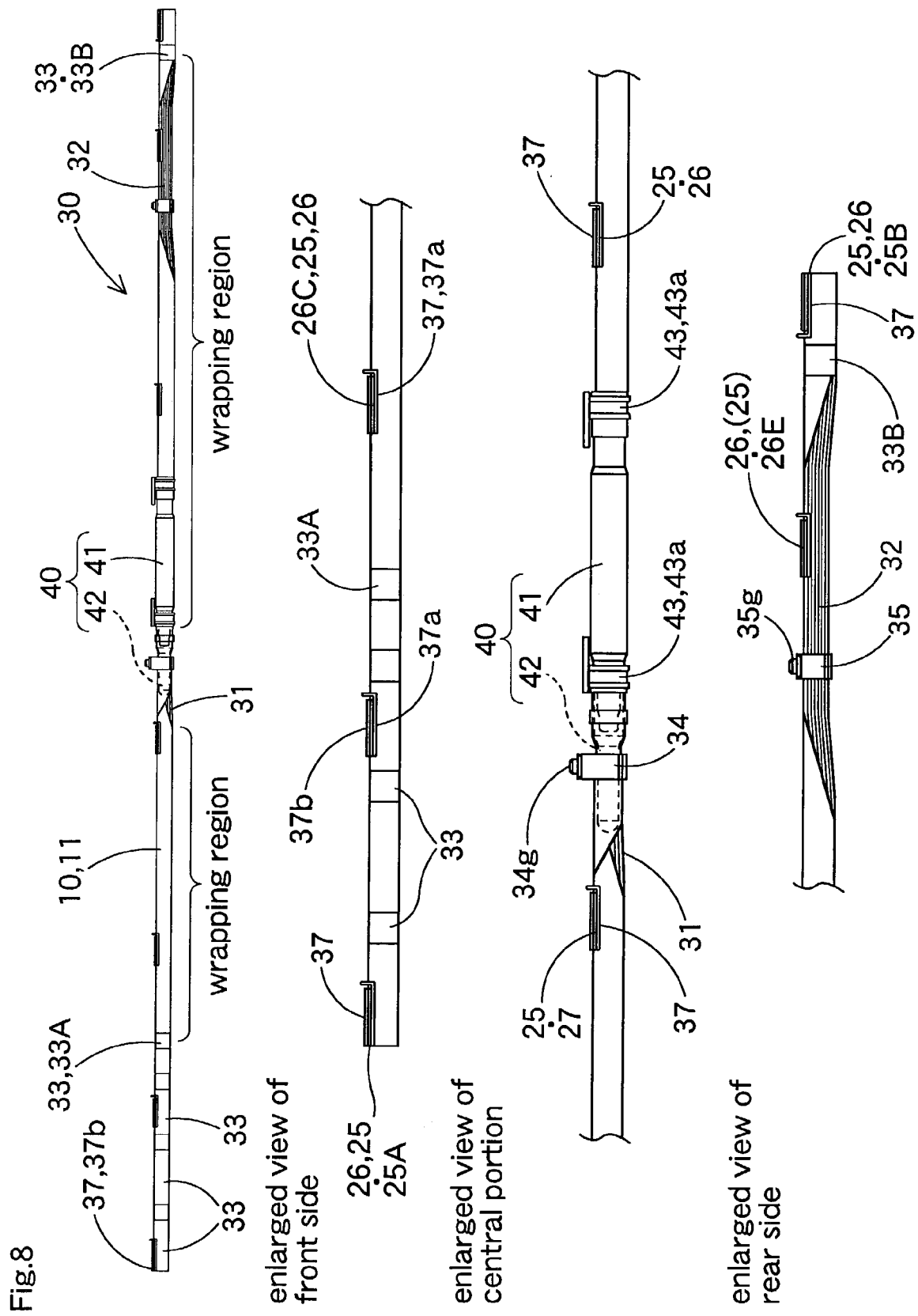
FIG. 8 is a top plan view of the airbag assembly of the first embodiment.
Figure 9:
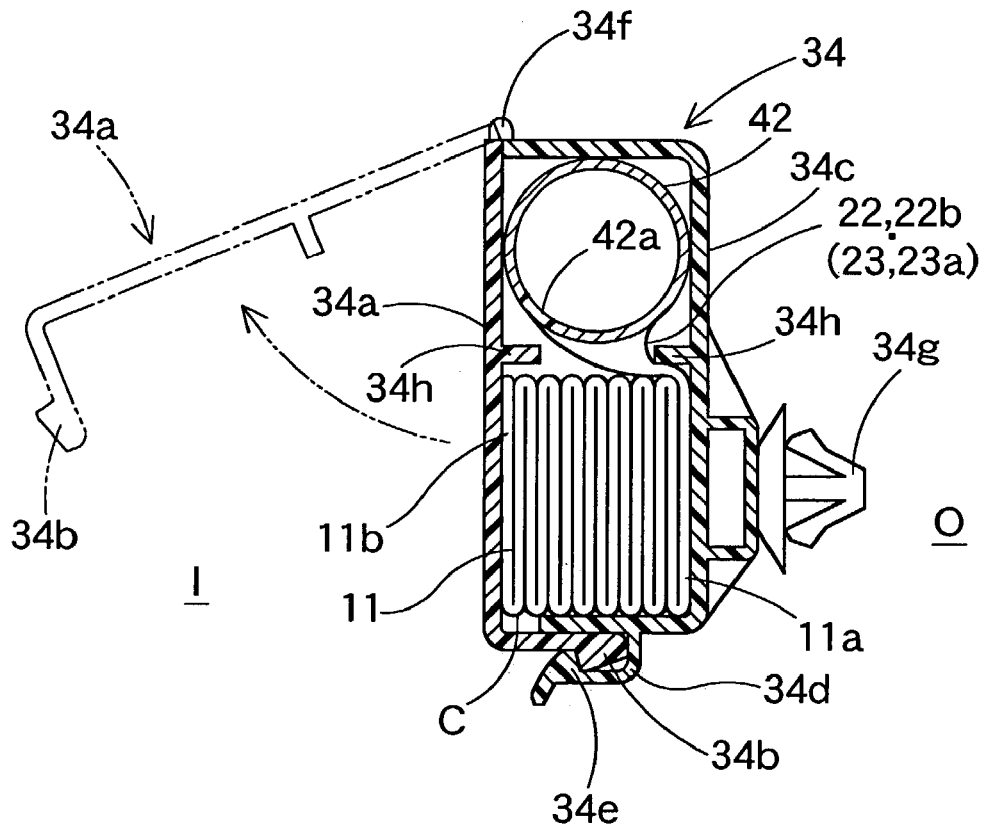
FIG. 9 is an enlarged schematic section of portion IX—IX of FIG. 7.
Figure 10:
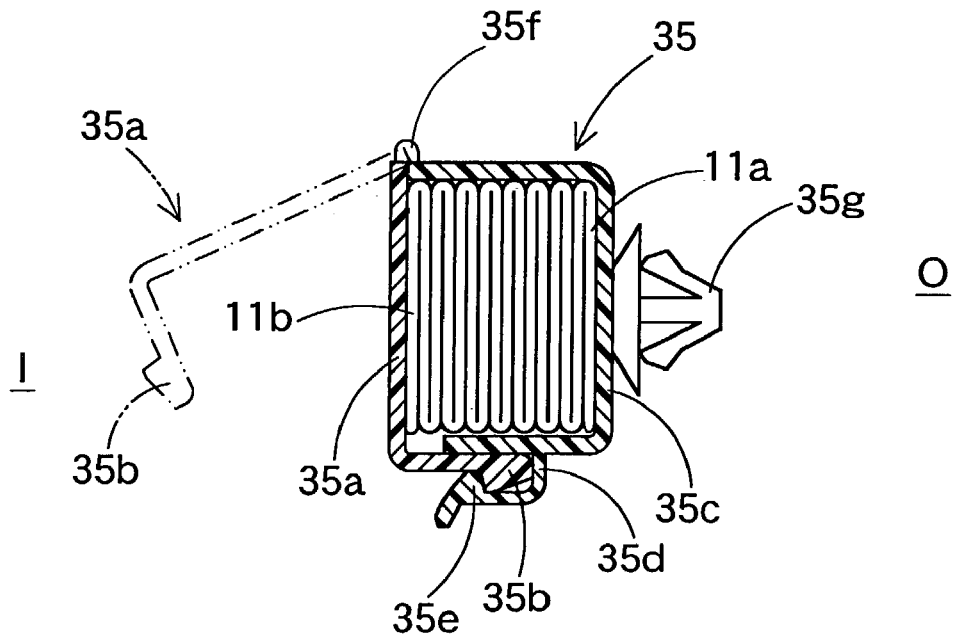
FIG. 10 is an enlarged schematic section of portion X—X of FIG. 7.

When the airbag 10 is mounted in the folded state on the vehicle V1, twisted portions 31/32 are formed by the diffuser 42, that is, above the first intermediate pillar portion P1 and above the second intermediate pillar portion P2, as shown in FIGS. 7 and 8. The clamps 34/35 are assembled with the twisted portions 31/32 so that the twisted portions 31/32 do not become untwisted.

These twisted portions 31/32 are so provided as to protrude the airbag 10 to the interior side I while preventing the airbag 10 (or its main portion 11) folded in a bellows shape from being hooked, when inflated, by the upper ends 6a/7a of the garnishes 6/7. Specifically, each twisted portion 31/32 is so twisted that the portion by the upper edge 11a of the main portion 11 on the upstream side of the inflating gas flowing into the main portion 11 is positioned toward the exterior side O whereas the portion by the lower edge 11b of the main portion 11 on the downstream side of the inflating gas is positioned toward the interior side I, unlike the portions above the windows W1/W2. When the gas feed passage portion 13 by the upper edge 11a is inflated by the entering gas, therefore, the portion outside the upper edge 11a is hardly moved because the upper edge 11a is fixed on the body 1 by the mounting portions 25. Further, the side of the lower edge 11b is pushed to the interior side I so that the main portion 11 can protrude to the interior side. I without being hooked by the upper ends 6a/7a of the garnishes 6/7. In another upper portion such as above the window W1, as shown in FIG. 5, the lower edge 11b is arranged below the upper edge 11a and slightly further toward the exterior side O than the upper edge 11a.

Figure 11:
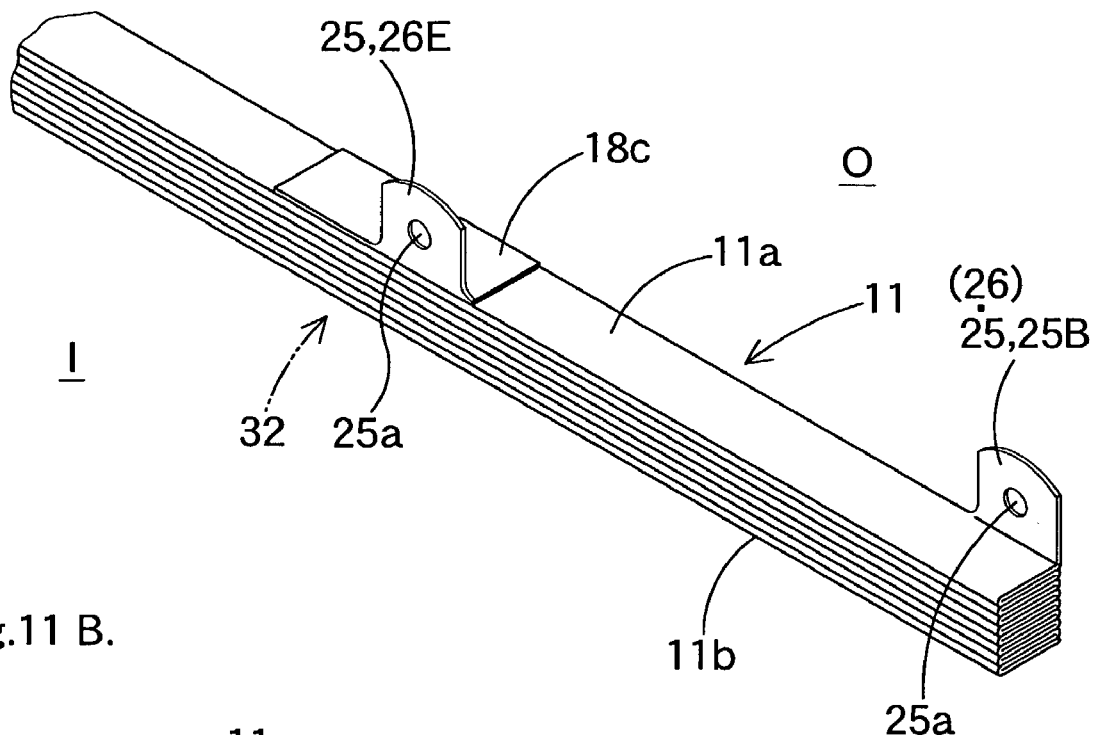
FIG. 11A and FIG. 11B are explanatory views showing the formation of a twisted portion in an airbag of the first embodiment.
Figure 11:
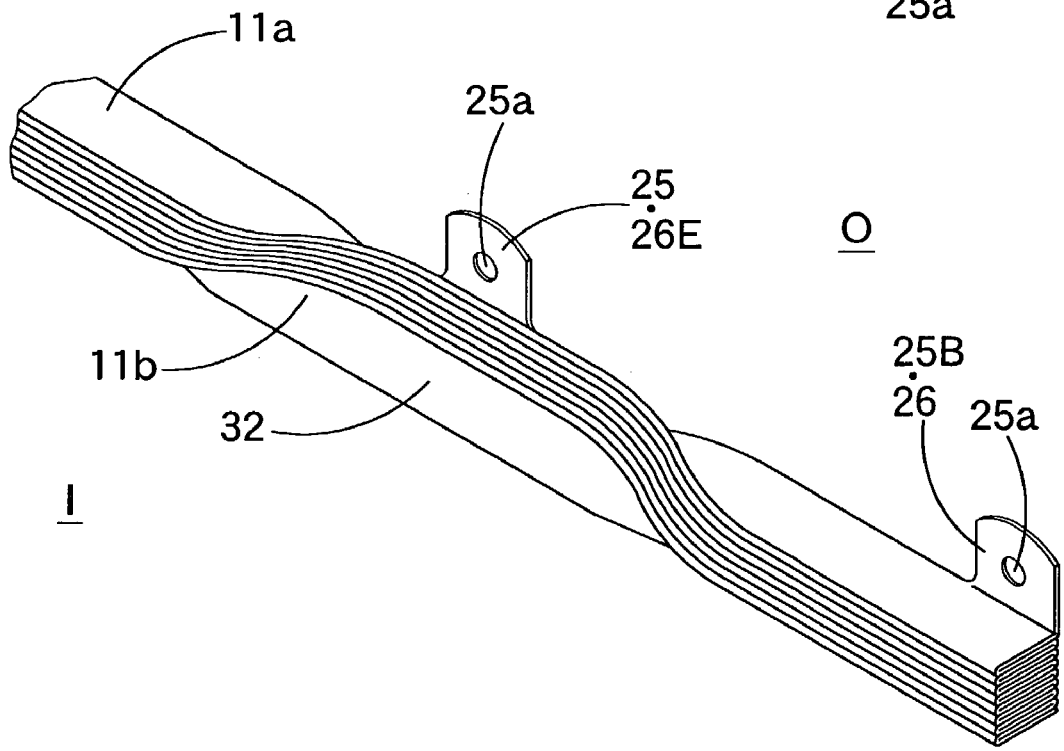

Moreover, after the main portion 11 is folded, the extension 18a of the main portion 11 in the airbag 10 is folded toward the interior side I, as shown in FIG. 11A. Next, the portion 32 of the main portion 11 by the extension 18a is twisted so that the lower face of the lower edge 11b faces the interior side I, and so that the main portion 11 can be arranged to have the mounting portion 26E located at the same height as that of the adjoining mounting portion 25B. In the twisted portion 31 also, the inlet port 22 is arranged in the same way as the extension 18a.

On the other hand, the clamps 34/35 are made of a synthetic resin such as polypropylene, as shown in FIGS. 3, 4, 9 and 10. Each clamp 34/35 is provided with an interior side portion 34a/35a extending to the interior side I, an exterior side portion 34c/35c extending to the exterior side O, and between them a hinge portion 34f/35f comprising a thin integral hinge and arranged on the upper side of each clamp 34/35. A hinge portion 34f/35f is arranged near the corner of the upper side of each clamp 34/35 toward the interior side I at the upper end of each interior side portion 34a/35a. Moreover, a retaining hook portion 34b/35b is formed at the lower end of each interior side portion 34a/35a which is bent toward the exterior side O. A retaining portion 34d/35d for retaining each retaining hook portion 34b/35b is formed at the lower end of each exterior side portion 34c/35c which is bent toward the interior side I. Each retaining portion 34d/35d forms a groove which is opened to the interior side I. On the inner periphery of the groove formed by each retaining portion 34d/35d, moreover, there is arranged a retaining step portion 34e/35e for retaining each retaining leg portion 34b/35b. Moreover, each clamp 34/35 is formed into a generally rectangular cylinder shape when each retaining leg portion 34b/35b is retained in each retaining portion 34d/35d.

Here, the size of the internal rectangular cylinder space formed when the clamp 34 is closed is sufficient for the cross-section of the diffuser 42 laid over the folded main portion 11 of the airbag 10 above the first intermediate pillar portion P1. On the other hand, the size of the internal rectangular cylinder space formed when the clamp 35 is closed is sufficient for the cross-section of the folded main portion 11 of the airbag 10 above the second intermediate pillar portion P2. In the clamp 34, moreover, holding ridges 34h are formed to protrude from the interior side portion 34a and the exterior side portion 34c. These holding ridges 34h are arranged to maintain the state of the folded main portion 11.

On these clamps 34/35, moreover, clips 34g/35g are formed on the outer surfaces of the exterior side portions 34c/35c. The clips 34g/35g are inserted into the retaining holes 2e/2f of the inner panel 2 and are retained on the inner panel 2. Therefore, the clamps 34/35 having the folded main portion 11 of the airbag 10 housed in their internal spaces mount the airbag 10 on the vehicle V1 by retaining their clips 34g/35g in the inner panel 2, while maintaining the twists of the twisted portions 31/32 in the main portion 11 of the airbag 10.

When the airbag 10 is inflated, first the retaining leg portions 34b/35b are pushed by the main portion 11 and come out of the retaining portions 34d/35d. Then, the interior side portions 34a/35a are opened on the hinge portions 34f/35f and the main portion 11 protrudes toward the interior side I.

Here will be described how to assemble the head protecting airbag device M1 of the first embodiment. First of all, the flow regulating fabric 23 is inserted into the inlet port 22 in the main portion 11 of the airbag 10, and the airbag 10 is folded up. As shown in FIGS. 12 and 2 to 5, the airbag 10 is folded into a bellows shape from the uninflated, extended flat state so that it is piled up in a generally vertical direction. Specifically, the airbag 10 is folded in the bellows shape with creases C parallel to the upper edge 11a so that the lower edge 11b comes close to the upper edge 11a. After being folded, moreover, the airbag 10 is wrapped with a not-shown wrapping member. Here in the case of the embodiment, the folded airbag 10 is braid-wrapped with not-shown wrapping string. The places wrapped are to the front and the rear of the inlet port 22 (FIGS. 7 and 8). The airbag assembly 30 in FIGS. 7 and 8 is shown in the state of being mounted on the vehicle. The twisted portions 31/32 are not yet formed when the airbag 10 is folded. The twisted portion 31 is formed at the time when the clamp 34 is mounted. The twisted portion 32 is formed at the time when the airbag assembly 30 is mounted on the inner panel 2.

The front end and the rear end the wrapping portions are wound with a breakable tape member 33 for preventing the wrapping string from becoming untied (in other words, the two areas from the tape member 33A to the mounting portion 27 and from the vicinity of the rear end of the inlet port 22 to the tape member 33B are braided with the wrapping string). Also, the thinly folded portions of the airbag 10 are braided with the tape member 33.

After the folded airbag 10 is wrapped, moreover, the individual mounting portions 25 are pulled out, and the mounting brackets 37 are mounted on the mounting portions 25. At the same time, the diffuser 42 of the gas feeder member 40 is inserted into the horizontal cylinder portions 22b/23a of the inlet port 22 and the flow regulating fabric 23. Then, the inlet port 22 and the diffuser 42 are connected by the clamp 45. Here, the diffuser 42 and the mounting brackets 43 are assembled in advance with the inflator 41.

Next, the folded airbag 10 is twisted to make the lower edge 11b of the main portion 11 face the interior side I, thereby forming the twisted portion 31, and the clamp 34 is fitted on the twisted portion 31. Then, the clamp 35 is fitted on that portion of the folded main portion 11 at which the twisted portion 32 is to be formed. Thus, the airbag assembly 30 can be formed. As has been described, however, the twisted portion 32 is not formed when the airbag assembly 30 is formed.

Figure 17:
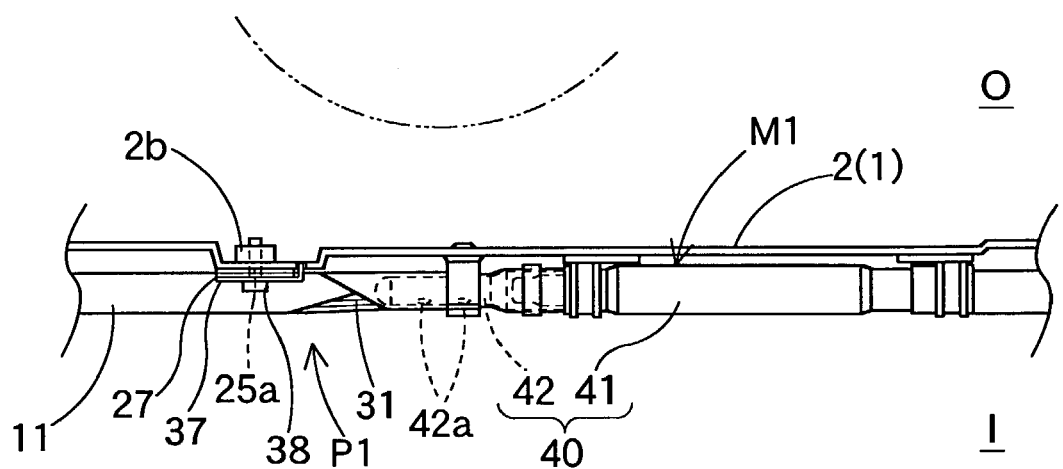
FIG. 17A and FIG. 17B are top plan views for explaining the instant when a first intermediate pillar portion of the first embodiment is forced to the vehicular interior side.
Figure 17:
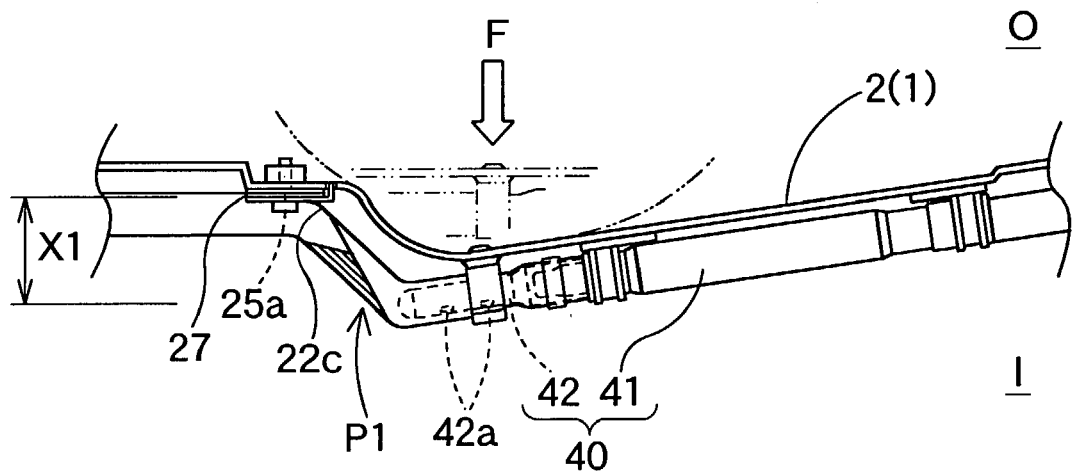

Then, the clip portions 34g/35g of the individual clamps 34/35 are inserted and retained in the retaining holes 2e/2f. On the other hand, the individual mounting brackets 37/43 are arranged at predetermined positions on the inner panel 2. Then, mounting bolts 36/39 are individually inserted into the mounting holes 37c/25a/43c and are fastened in the nuts 2b/2d of the mounting holes 2a/2c thereby to fix the individual mounting portions 25 of the airbag 10 and the gas feeder member 40 on the inner panel 2. As a result, the airbag assembly 30 can be mounted on the body 1. At this time, the mounting portion 26E to be arranged by the twisted portion 32 is mounted on the inner panel 2 by means of the mounting bracket 37 and the mounting bolt 38, so that the twisted portion 32 is formed with its lower edge 11b facing the interior side I. In the state of the airbag assembly 30 before being mounted on the inner panel 2, more specifically, the mounting portion 26E is positioned on the interior side I of the folded main portion 11, as shown in FIG. 11A. Then, this mounting portion 26E is positioned, when it is fixed on the inner panel 2, on the exterior side O of the folded main portion 11. At this time, the main portion 11 at this position is twisted, as the mounting portion 26E moves, so that the lower edge 11b faces the interior side I. As a result, the twisted portion 32 is formed (FIG. 11B). Next, the front pillar garnish 4 and the roof head lining 5 are mounted on the body 1. Moreover, the first/second intermediate pillar garnishes 6/7 and a rear pillar garnish 8 are mounted on the body 1. Thus, the head protecting airbag device M1 is mounted on the vehicle V1. When the airbag 10 is mounted on the vehicle V1, the mounting portion 27 and the gas discharge ports 42a/42a of the diffuser 42 are aligned generally in the longitudinal direction of the vehicle V1 (FIG. 17A).

If the inflator 41 of the gas feeder member 40 is activated after the device M1 is mounted on the vehicle V1, the inflating gas is discharged from the individual gas discharge ports 42a of the diffuser 42. Then, the inflating gas is fed to the gas feed passage portion 13 of the gas receiving portion 12 through the vertical cylinder portion 22a of the inlet port 22 (and the vertical cylinder portion 23b of the flow regulating fabric 23) and further through the gas outlet ports 23c/23d. After this, the inflating gas flows into the individual vertical cells 14a/15a of the front/rear inflation portions 14/15 so that the main portion 11 of the airbag 10 begins to be inflated while being unfolded. Then, the main portion 11 breaks the wrapping string (not shown) and the tape members 33, and pushes and opens the interior side portions 34a/25a of the clamps 34/35 toward the interior side I. After this, the main portion 11 pushes and opens the lids 4a/5a of the front pillar garnish 4 and the roof head lining 5 so that it is greatly inflated, covering the interior side I of the windows W1/W2/W3 and the pillar portions P1/P2, as indicated by double-dotted lines in FIGS. 1 to 5.

At this time, in the airbag 10 of the first embodiment, the vicinity mounting portion 27 arranged near the inlet port 22 is mounted together with the remaining general mounting portions 26 on the inner panel 2 on the side of the body 1.

Therefore, the airbag 10 is smoothly inflated without having its vicinity near the inlet port 22 vibrated, for example up and down.

As shown in FIGS. 17A and 17B, moreover, during the actual operation, the first intermediate pillar portion P1 may be displaced toward the interior side I by an impact F coming from the exterior side O. Specifically, the vicinity mounting portion 27, mounting the vicinity of the inlet port 22 of the airbag 10 to the body 1, and the gas discharge ports 42a of the gas feeder member 40 may separate in the interior I—exterior O direction.

In the head protecting airbag device M1 of the first embodiment, however, the slit 28 as a downward recess is arranged between the vicinity mounting portion 27 and the inlet port 22, as shown in FIGS. 15A and 15B. This slit 28 is so arranged as to maximize the possible separation of the vicinity mounting portion 27 and the inlet port 22 from each other in the interior-exterior direction. By forming the slit 28, more specifically, it is possible to substantially enlarge the length sizes of the outer peripheral edge 27a of the vicinity mounting portion 27 facing the inlet port 22 and the outer peripheral edge 22c of the inlet port facing the vicinity mounting portion 27. Unlike the case in which the downward recess is not formed between the vicinity mounting portion 27 and the inlet port 22, therefore, the head protecting airbag device M1 enables the inlet port 22 to follow the relative displacement of the gas discharge ports 42a to some extent, when the inlet port 22 follows the relative displacement of the gas discharge ports 42a, by extending both the outer peripheral edge 27a of the vicinity mounting portion 27 facing the inlet port 22 and the outer peripheral edge 22c of the inlet port 22 facing the vicinity mounting portion 27 to be on one flat plane, as shown in FIGS. 15A and 15B and FIGS. 17A and 17B. This is because the slit 28 is formed to enlarge the length of the outer peripheral edge of the vicinity mounting portion 27 facing the inlet port 22 and the outer peripheral edge 22c of the inlet port 22 facing the vicinity mounting portion 27. Thus, it is possible to effectively prevent the gas discharge ports 42a from clogging the inlet port 22. As a result, the inflating gas discharged from the gas discharge ports 42a, flows without any trouble into the gas receiving portion 12 of the airbag 10 through the inlet port 22. Thus, the airbag 10 can be smoothly inflated.

In the head protecting airbag device M1 of the first embodiment, therefore, the airbag 10 is provided with a inlet port 22 formed above the first intermediate pillar portion P1 for admitting the inflating gas so that the smooth expansion of the airbag can be assured even if the first intermediate pillar portion P1 is largely displaced toward the interior side I.

Here in the first embodiment, the downward recess between the vicinity mounting portion 27 and the inlet port 22 of the airbag 10 is formed to be a slit 28. As long as a downward recess is formed between the vicinity mounting portion 27 and the inlet port 22 of the airbag 10, however, the shape may be modified, as shown in FIG. 18 or 19.

Figure 18:
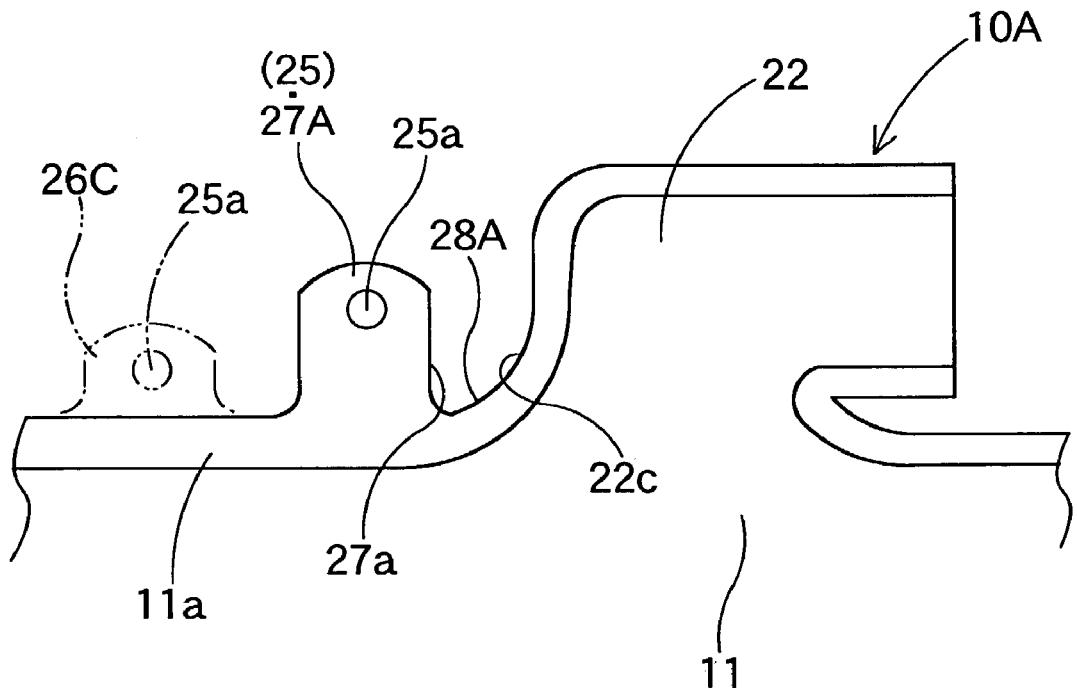
FIG. 18 is a partial front elevation showing a modification of the airbag of the first embodiment.

In an airbag 10A shown in FIG. 18, a vicinity mounting portion 27A to be arranged near the inlet port 22 is so extended upward that the mounting hole 25a positioned above the upper edge 11a of the main portion 11 of the airbag 10A may be higher than the mounting hole 25a of a general mounting portion 26 such as 26C (FIG. 12). Therefore, a downward recess 28A between the vicinity mounting portion 27A and the inlet port 22 of the airbag 10A makes the length of the outer peripheral edge 27a of the vicinity mounting portion 27A facing the inlet port 22 and the outer peripheral edge 22c of the inlet port 22 facing the vicinity mounting portion 27A much longer than if the general mounting portion 26C were arranged in place of the vicinity mounting portion 27A. As a result, the separation of the vicinity mounting portion 27A and the inlet port 22 from each other in the interior I—exterior O direction can be increased to retain the smooth expansion and inflation of the airbag 10A.

Figure 19:
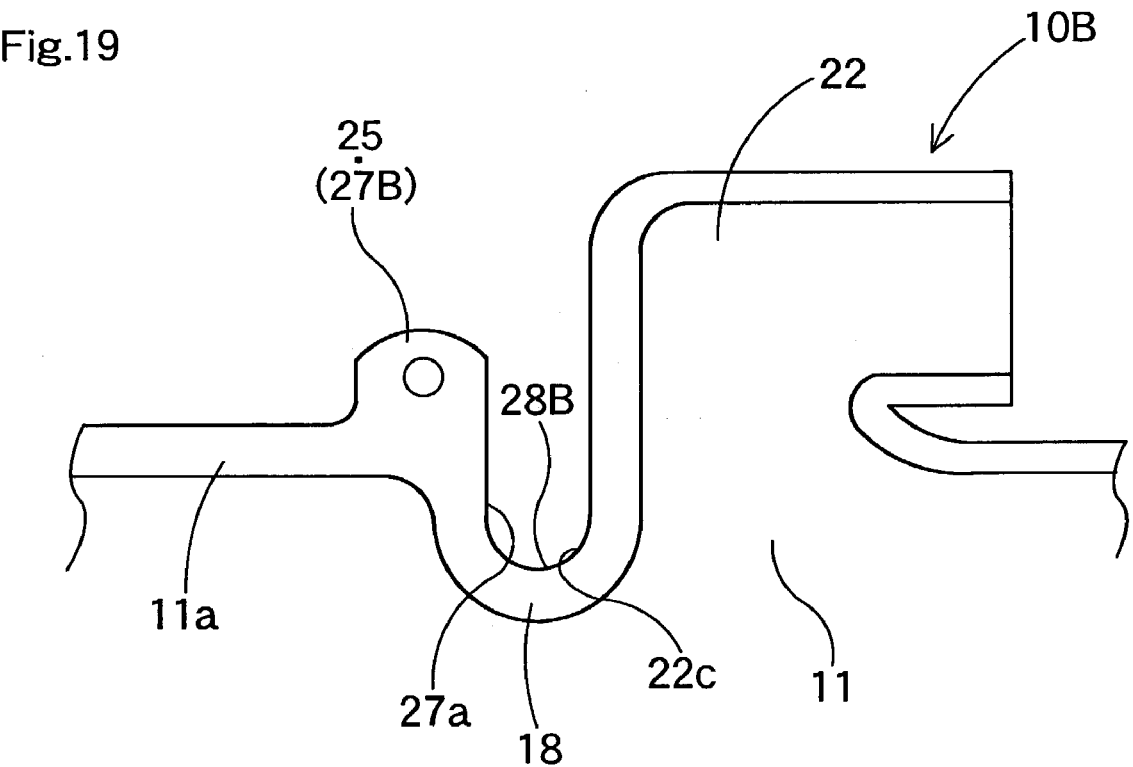
FIG. 19 is a partial front elevation showing another modification of the airbag of the first embodiment.

In an airbag 10B shown in FIG. 19, on the other hand, a vicinity mounting portion 27B to be arranged near the inlet port 22 arranges the mounting hole 25a at the same height as that of the mounting hole 25a of another general mounting portion 26 such as the general mounting portion 26C above the front end of the front inflation portion 14. In the airbag 10B, however, the outer peripheral edge 18 of the main portion 11 between the vicinity mounting portion 27B and the inlet port 22 is more recessed downward than the other portions. Therefore, the downward recess 28B between the vicinity mounting portion 27B and the inlet port 22 of the airbag 10B substantially enlarges the length of the outer peripheral edge 27a of the vicinity mounting portion 27B facing the inlet port 22 and the outer peripheral edge 22c of the inlet port 22 facing the vicinity mounting portion 27B, by an amount corresponding to the depth of the recess of the outer peripheral edge 18. As a result, the separation of the vicinity mounting portion 27B and the inlet port 22 from each other in the interior I—exterior O direction can be increased, and the smooth expansion and inflation of the airbag 10B can be assured.

Figure 20:
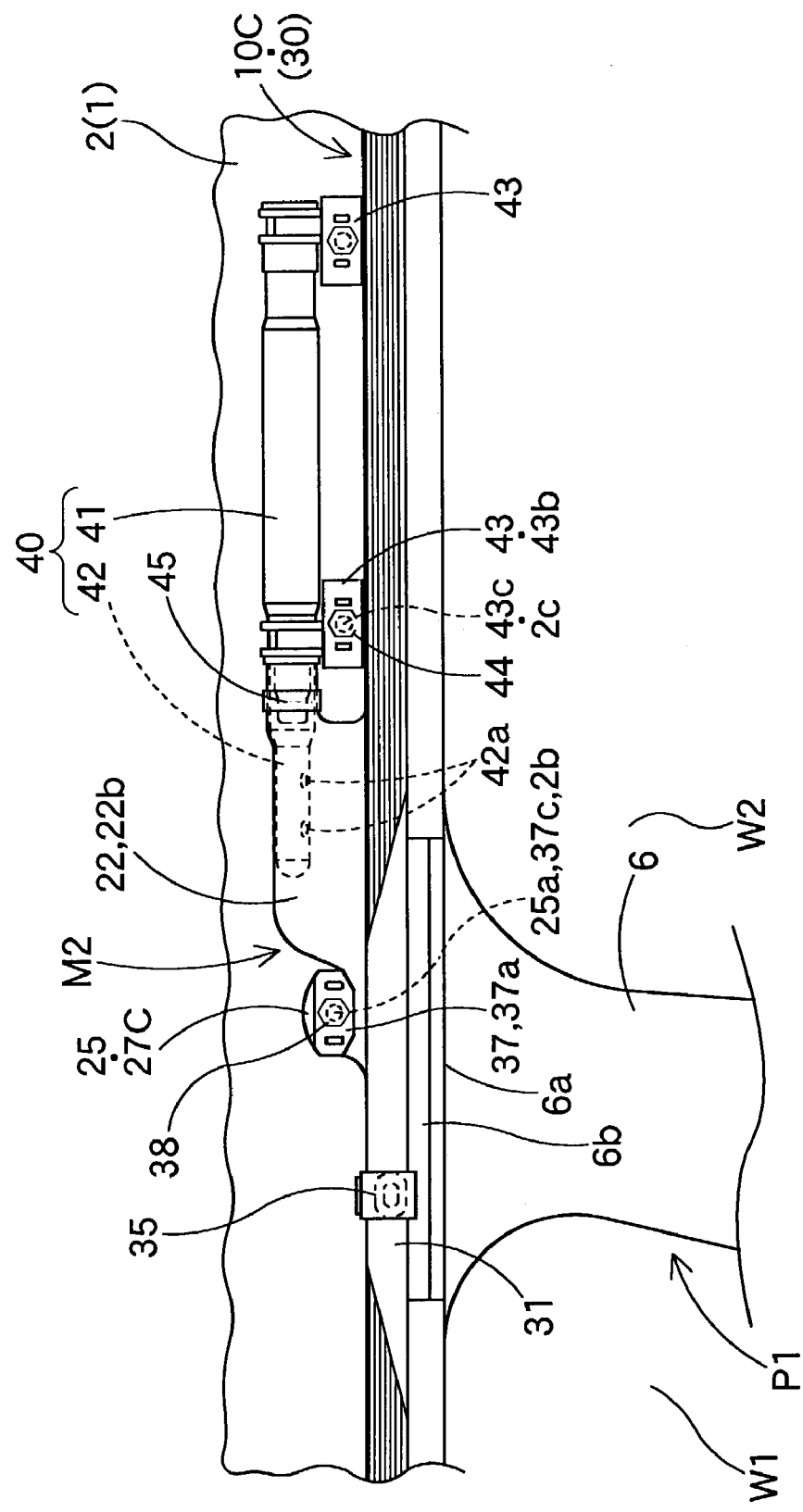
FIG. 20 is a partial front elevation showing the upper vicinity of a first intermediate pillar portion in a head protecting airbag device according to a second embodiment of the invention, with roof head lining omitted.

In a head protecting airbag device M2 of a second embodiment shown in FIG. 20, moreover, a vicinity mounting portion 27C and an inlet port 22 in an airbag 10C, and a gas feeder member 40 are offset from the center in the longitudinal direction of the vehicle V1 over the first intermediate pillar portion P1, toward the front side or the rear side of the vehicle. In the case of the embodiment, the vicinity mounting portion 27C, the inlet port 22 and the gas feeder member 40 are offset to the rear side of the top of pillar portion P1.

Here in this second embodiment, in addition to the aforementioned offset arrangement, the inlet port 22 is not arranged at the threaded portion 31, which is arranged above the pillar portion P1. Near the vicinity mounting portion 27C, therefore, there is also arranged an extension similar to that 18a of the airbag 10 of the first embodiment. The construction is further modified so that a slit 28 is not formed between the vicinity mounting portion 27C and inlet port 22. The remaining construction is similar to that of the first embodiment.

Figure 21:
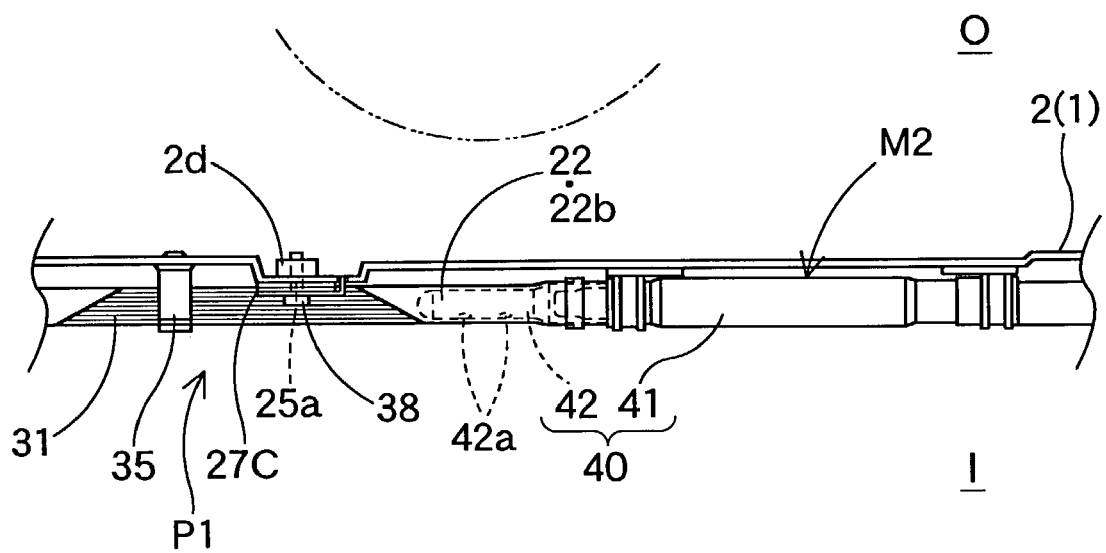
FIG. 21A and FIG. 21B are top plan views for explaining the instant when the first intermediate pillar portion of the second embodiment is impacted into the vehicular interior side.
Figure 21:
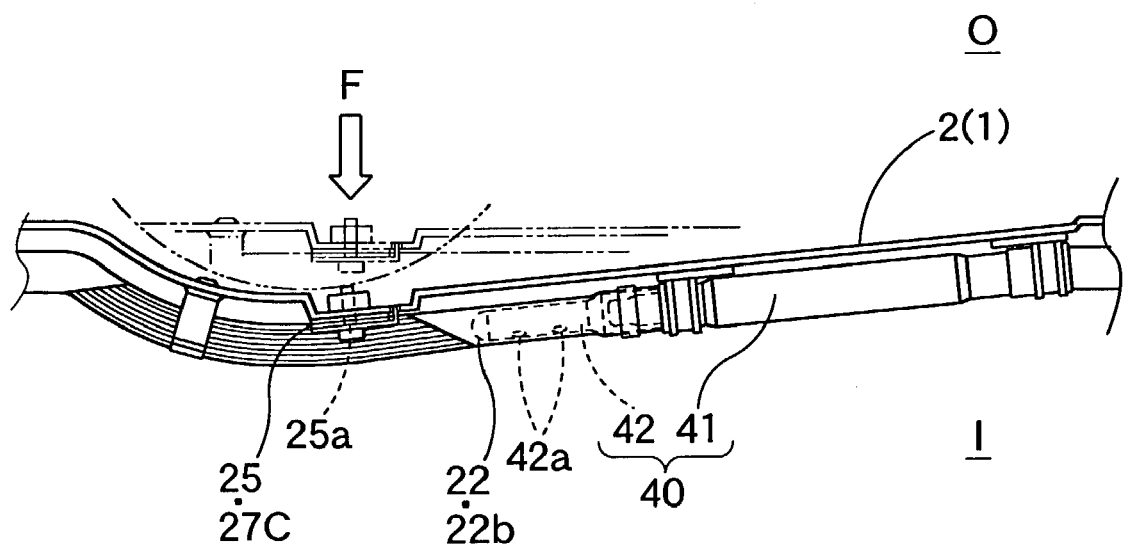

The usual operations of this second embodiment are similar to those of the device of the first embodiment. As shown in FIGS. 21A and 21B, moreover, the vicinity mounting portion 27C, the inlet port 22 and the gas feeder member 40 are integrally displaced toward the interior side I when the first intermediate pillar portion P1 is displaced during the actual operation of the airbag toward the interior side I by the impact F from the exterior side O. This is because the vicinity mounting portion 27C, the inlet port 22 and the gas feeder member 40 are offset to the rear side of the vehicle V1 away from the first intermediate pillar portion P1. Therefore, the relative displacement between the vicinity mounting portion 27C and the gas discharge ports 42a can be suppressed and the inlet port 22 can be prevented from clogging the gas discharge ports 42a. As a result, the inflating gas discharged from the gas discharge ports 42a, is introduced without any trouble through the inlet port 22 into the gas receiving portion 13 (not-shown) of the airbag 10C so that the airbag 10C can be smoothly inflated.

In the head protecting airbag device M2 of the second embodiment, therefore, the airbag 10C also includes the inlet port 22 above the first intermediate pillar portion P1 for introducing the inflating gas, so that the smooth expansion and inflation of the airbag 10C can be assured even if the first intermediate pillar portion P1 is greatly displaced toward the interior side I.

Here, the second embodiment exemplifies the case in which the vicinity mounting portion 27C, the inlet port 22 and the gas feeder member 40 are offset to the rear of the vehicle V1 away from the first intermediate pillar portion P1. However, the vicinity mounting portion 27C, the inlet port 22 and the gas feeder member 40 may also be offset toward the front of the first intermediate pillar portion P1.

Next will be described an airbag achieving the third object of the invention. A third embodiment will be exemplified by a head protecting airbag device.

Figure 22:
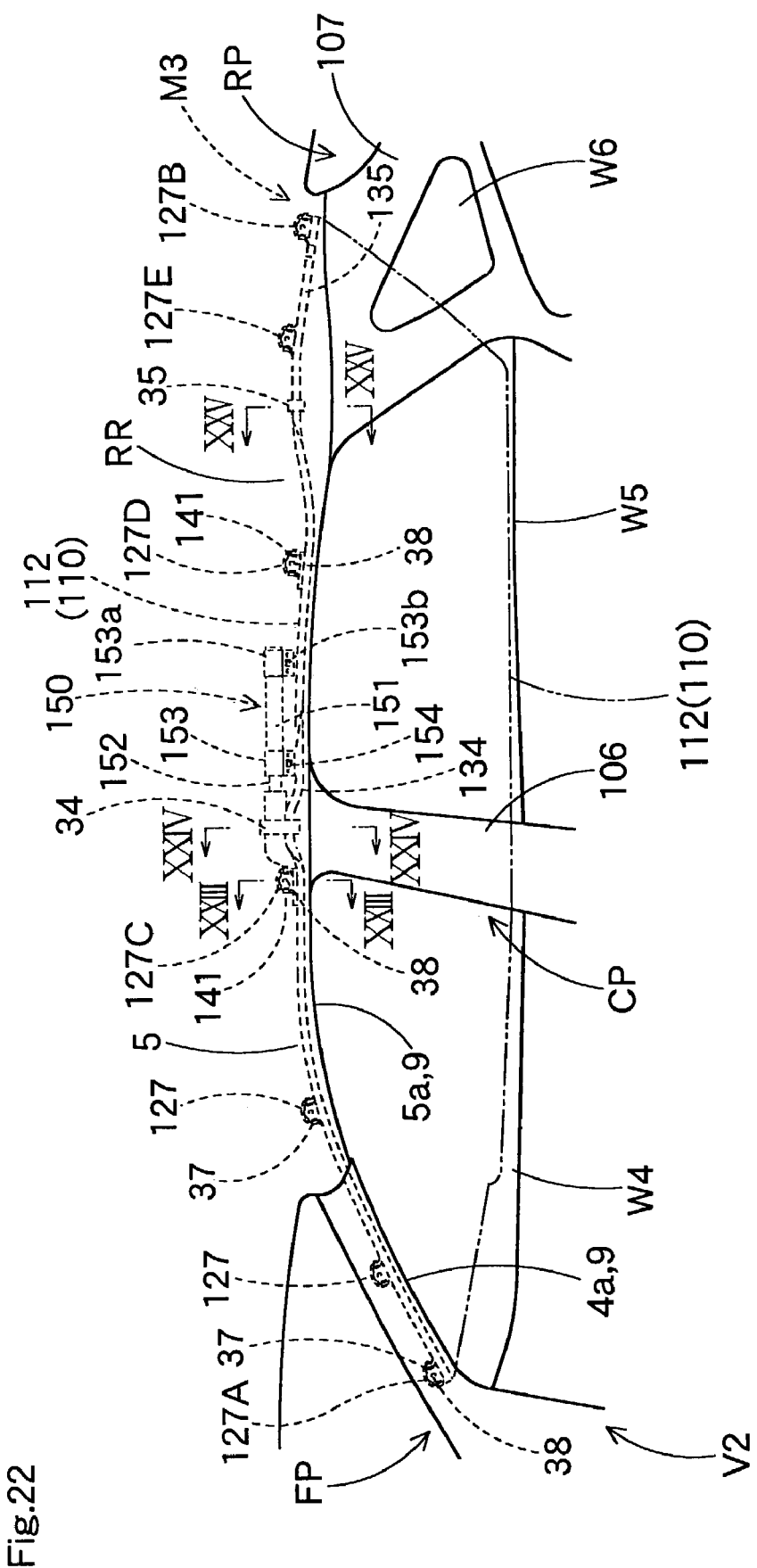
FIG. 22 is a front elevation, as taken from the vehicular interior, of a head protecting airbag device using an airbag according to a third embodiment of the invention.

The airbag 110 of a head protecting airbag device M3 of the third embodiment is folded and housed in the front pillar portion FP and the roof side rail portion RR on the upper edge of the windows (side windows) W4/W5 and the rear pillar portion RP, as shown in FIG. 22. Here, this vehicle V2 is constructed by arranging a generally vertical center pillar portion CP between the front pillar portion FP and the rear pillar portion RP and by arranging a small window W6 in the region of the rear pillar portion RP. Here in the head protecting airbag device M3, the description of the members similar to those of the aforementioned airbag device M1 will be omitted, designating them by the same reference numerals.

As shown in FIGS. 22 to 25, the head protecting airbag device M3 is provided with the airbag 110, clamps 34/35, mounting brackets 141/37/153, and an inflator 150. The head protecting airbag device M3 is housed, when mounted on the vehicle V2, with its interior side I covered with the airbag cover 9.

Figure 24:
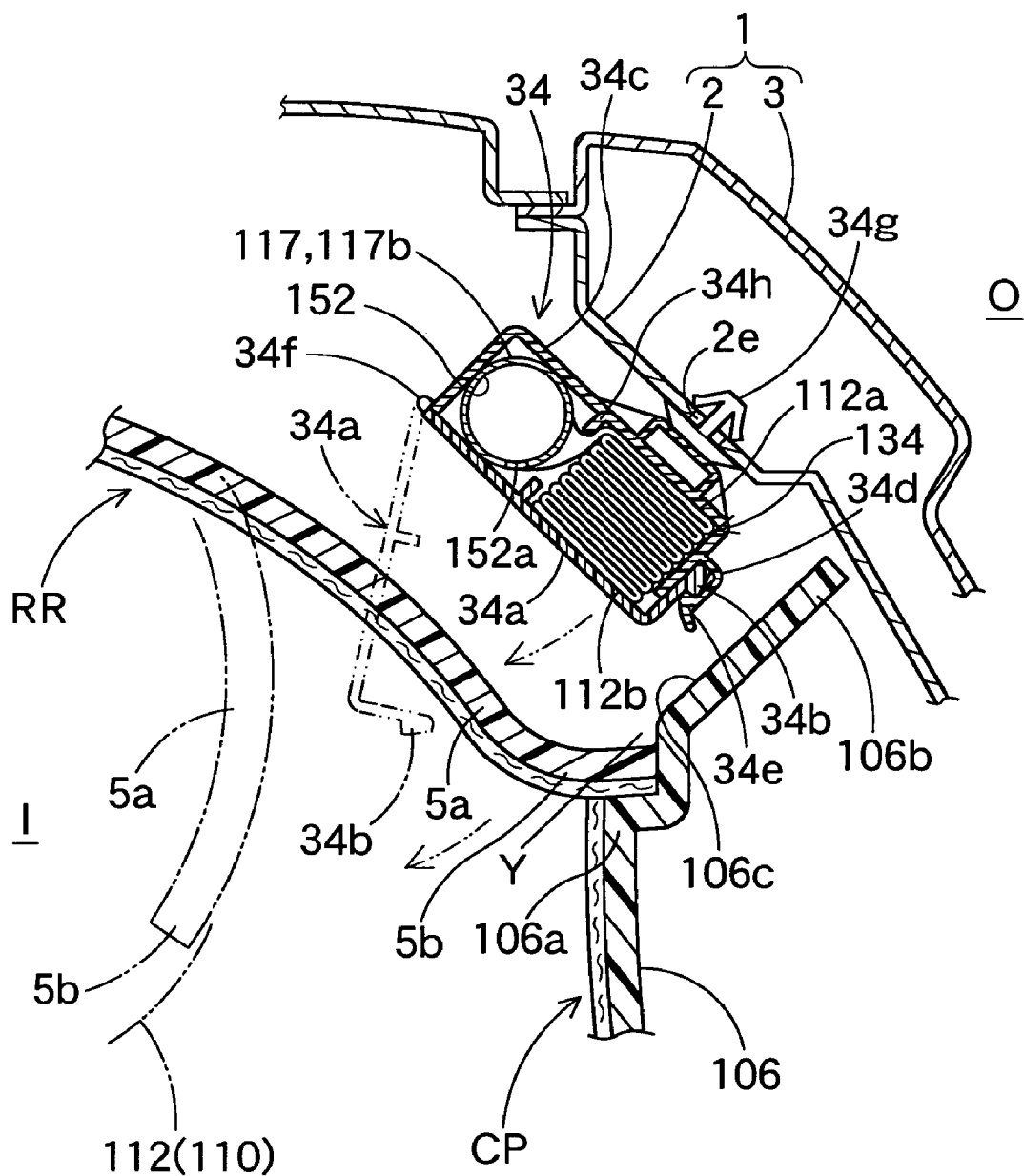
FIG. 24 is an enlarged schematic section of portion XXIV—XXIV of FIG. 22.
Figure 25:
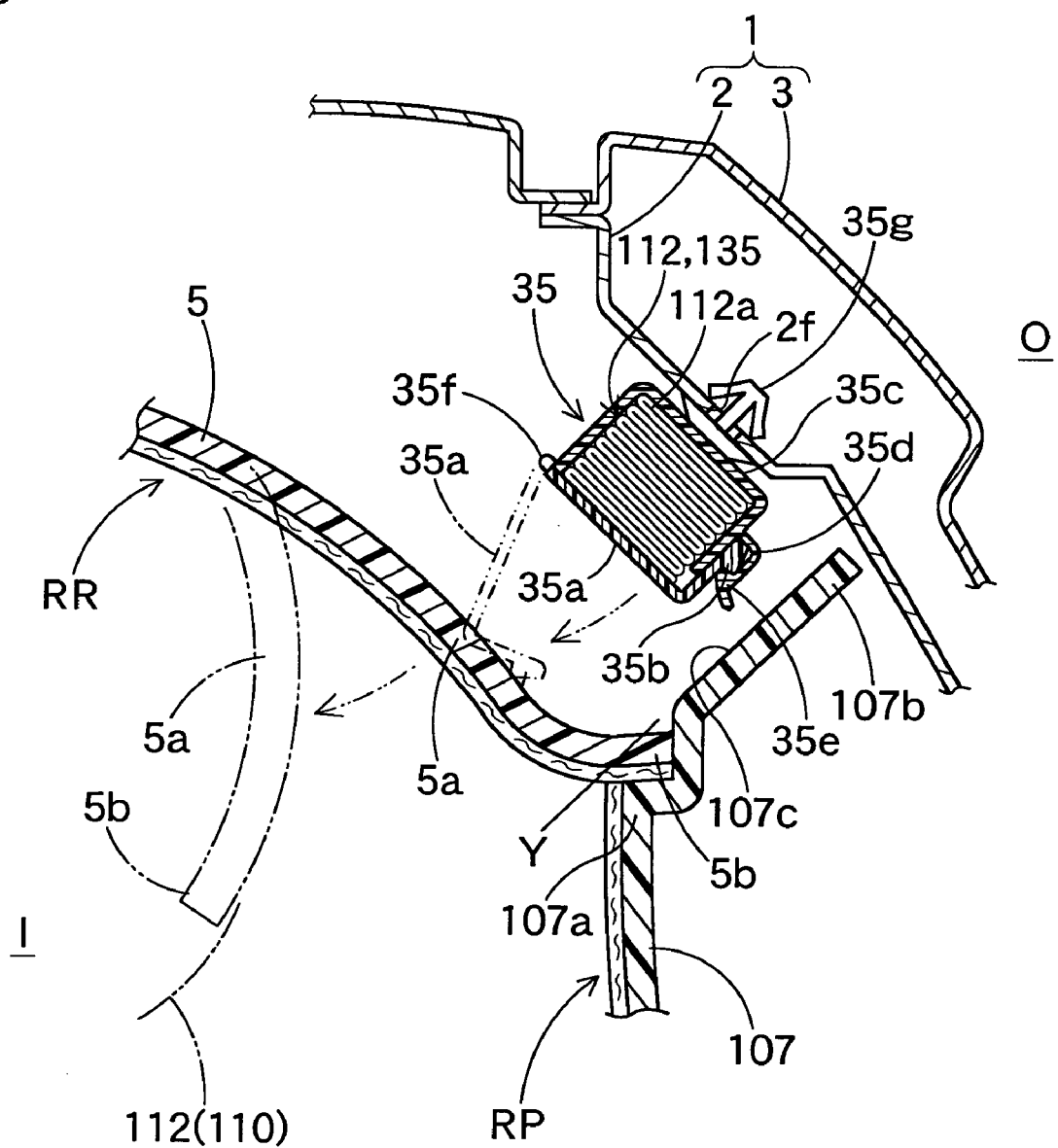
FIG. 25 is an enlarged schematic section of portion XXV—XXV of FIG. 22.

In the airbag device M3 of the third embodiment, the lower edge 5b of the lid 5a in the roof head lining 5 is retained at the center pillar portion CP and the rear pillar portion RP by the upper ends on the interior side 106a/107b of pillar garnishes 106/107 covering the interior side I of the pillar portion CP/RP, as shown in FIGS. 22, 24 and 25.

At the upper ends of the garnishes 106/107 on the vehicular exterior side O, as shown in FIGS. 24 and 25, there are arranged guide portions 106b/107b, which are inclined to be low toward the interior side I and high toward the exterior side O. These guide portions 106b/107b are so arranged below the folded main portion 112 as to guide the main portion 112 of the airbag 110 so that the main portion 112 may be smoothly rolled out, when inflating, to the interior side I. The guide portions 106b/107b have upper faces 106c/107c formed so that their extensions Y to the interior side I are positioned above the upper ends 106a/107a of the garnishes 106/107 on the interior side I.

Figure 26:
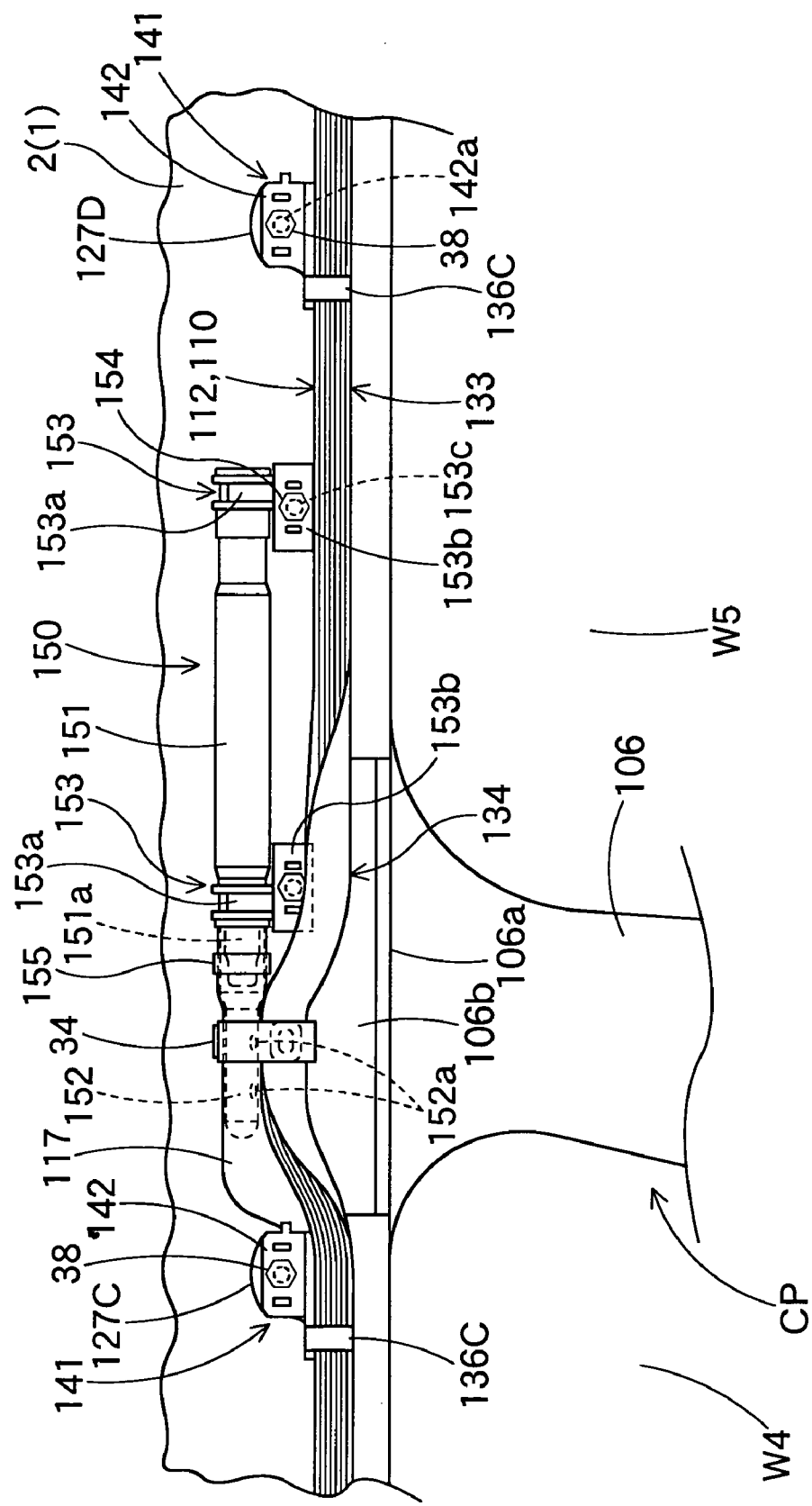
FIG. 26 is a partial front elevation showing the upper vicinity of a first intermediate pillar portion in the head protecting airbag device according to the third embodiment of the invention, with the roof head lining omitted.

As shown in FIGS. 22 and 26, the inflator 150 is provided with a main portion 151 for feeding the inflating gas to the folded airbag 110, and a diffuser 152 for guiding the inflating gas discharged from the main portion 151.

This main portion 151 is a generally cylindrical column having a head portion 151a at one of its ends. In the head portion 151a, moreover, there are arranged (not-shown) gas discharge ports for discharging the inflating gas.

The diffuser 152 is formed of a generally cylindrical pipe member made of a metal and having its end face closed. The diffuser 152 is joined to one end of the main portion 151 by caulking the open base of the diffuser 152 so as to cover the head portion 151a. In the lower side face of the diffuser 152 by its closed end, there are opened two gas discharge ports 152a/152a, which are aligned in the longitudinal direction of the vehicle V2. This diffuser 152 has a later-described flow regulating fabric 130 and an inlet port 117 of the airbag 110 mounted thereon. The diffuser 152 is connected to the airbag 110 by means of a clamp 155, which is mounted on the vicinity of the vehicular rear end of the inlet port 117.

With the diffuser 152 caulked and joined to the leading end of the main portion 151, the inflator 150 is mounted in the longitudinal direction of the vehicle V2 on the inner panel 2 of the body 1 by means of the mounting brackets 153 and mounting bolts 154. As shown in FIGS. 22 and 26, the mounting brackets 153 are made of a metal and provided with clamp portions 153a for clamping the vicinities of the front and rear ends of the main portion 151, and plate mounting portions 153b. In each mounting portion 153b, there is formed a mounting hole 153c for inserting the mounting bolt 154. The inflator 150 is fixed on the inner panel 2 of the body 1 like the gas feeder member 40 in the aforementioned airbag device M1.

In the state where the inflator 150 is mounted on the vehicle V2, as shown in FIGS. 24 and 26, the individual gas discharge ports 152a of the diffuser 152 are offset toward the interior side I away from the upper end 106a of the garnish 106 and are so arranged as to discharge the inflating gas downward in the vertical direction.

Here, this inflator 150 is mounted as part of the airbag assembly 132 (FIGS. 32 and 33) in which the inflator 150 and the airbag 110 are assembled, on the vehicle V2

As shown in FIG. 22, the airbag 110 is housed in its folded state in the roof side rail portion RR from the front pillar portion FP over the center pillar portion CP to the area above the rear pillar portion RP. Moreover, the airbag 110 covers, when inflated, the interior side I of the window W4/W5 to the front/rear of the center pillar portion CP, the window W6 arranged in the region of the rear pillar portion RP, the center pillar portion CP, and the rear pillar portion RP, as indicated by double-dotted lines in FIGS. 22 to 25.

The airbag 110 is manufactured by hollow-weaving polyamide yarns. The airbag 110 includes a gas receiving portion 111 and a non-inlet portion 119 not allowing passage of the inflating gas G. The gas receiving portion 111 admits the inflating gas G and is inflated to separate an interior side wall portion 111a and an exterior side wall portion 111b.

Figure 27:
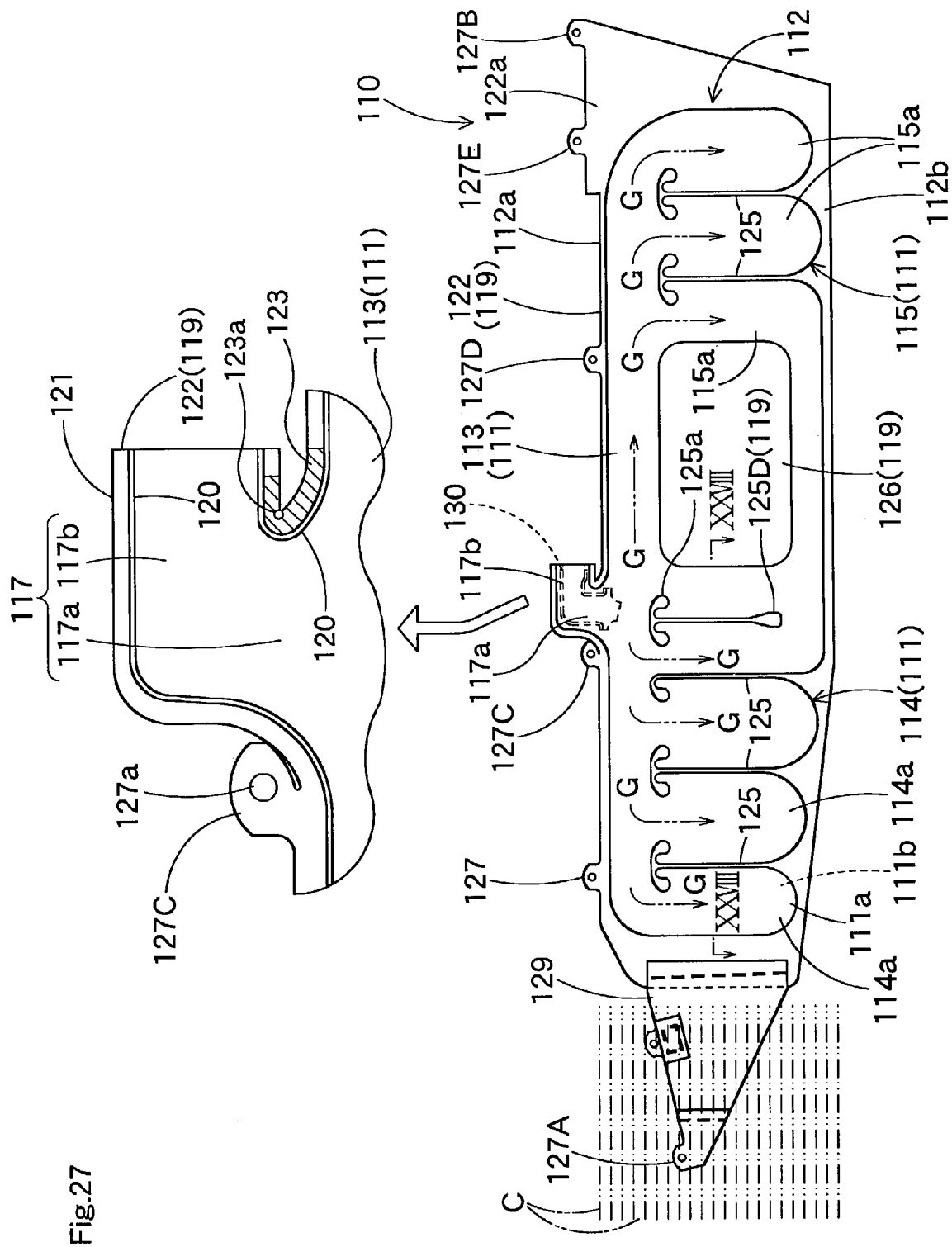
FIG. 27 is a front elevation of the airbag of the third embodiment.
Figure 28:
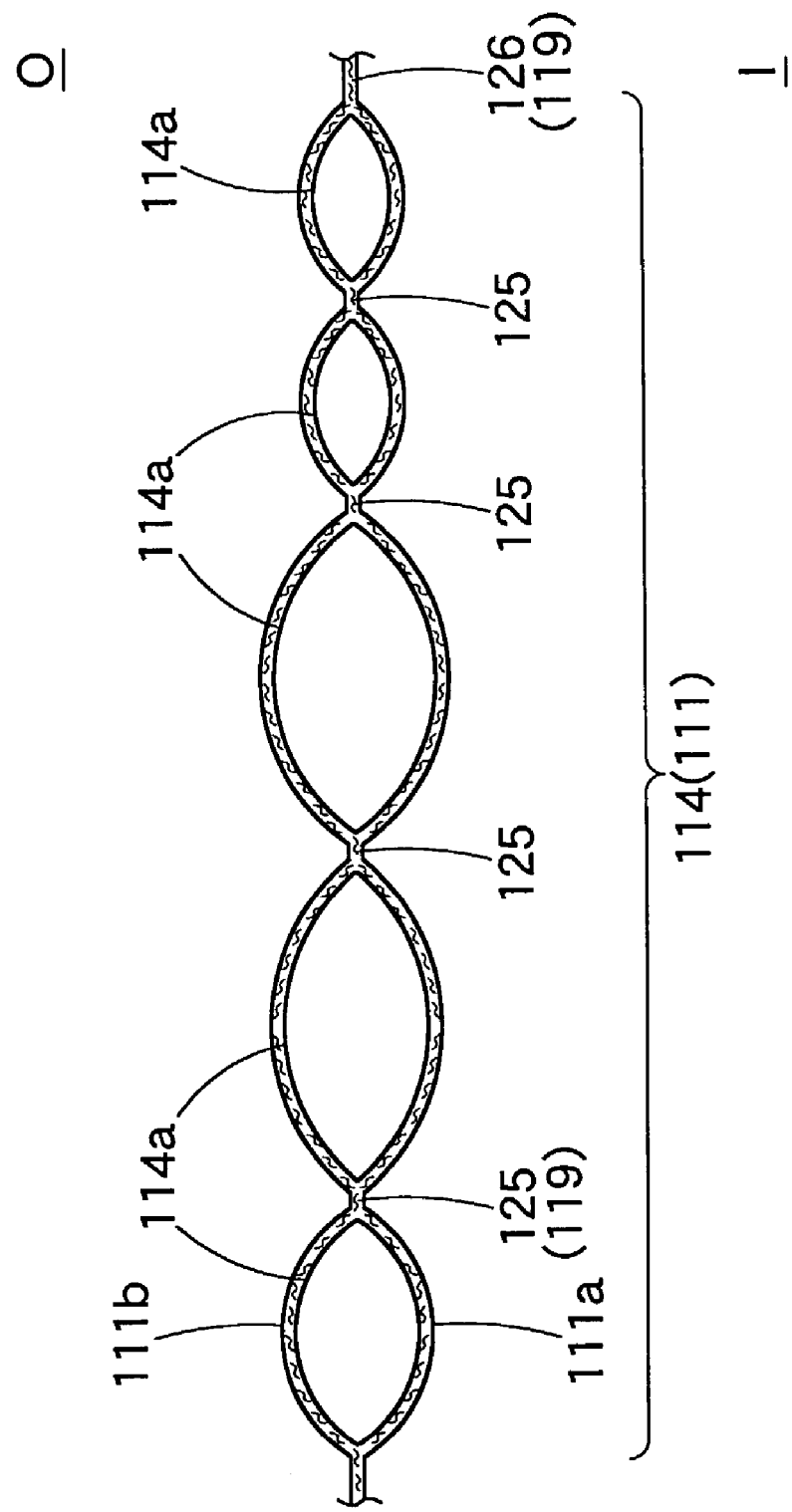
FIG. 28 is a transverse section showing the airbag of the third embodiment inflated, corresponding to portion XXVIII—XXVIII of FIG. 27.
Figure 29:
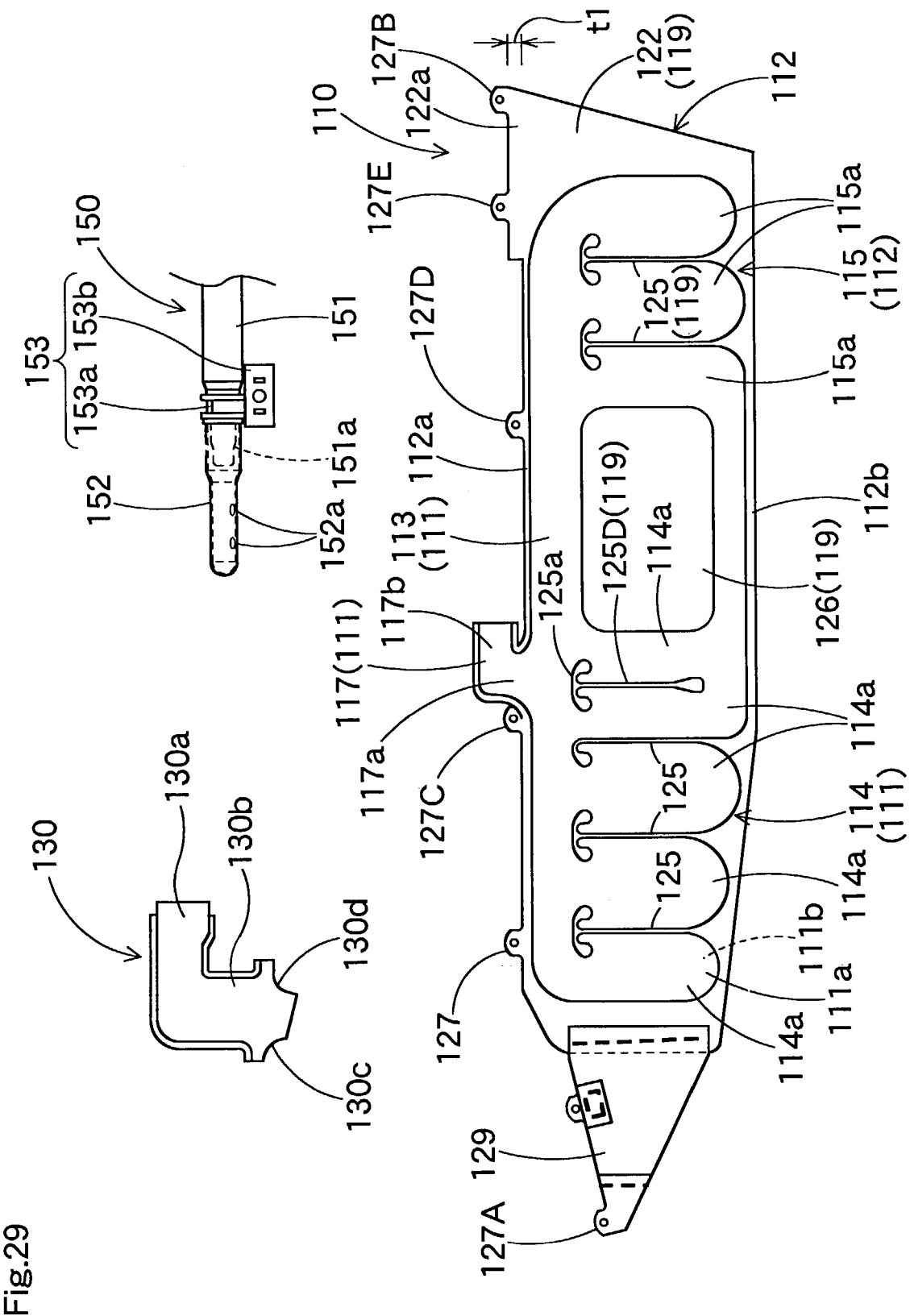
FIG. 29 is a front elevation showing a main portion and a flow regulating fabric of the airbag of the third embodiment.

In the case of the embodiment, as shown in FIGS. 27 to 29, the gas receiving portion 111 includes the main portion 112, and the inlet port 117 connected to the inflator 150 and fixed on the body 1 of the vehicle V2. The main portion 112 can cover, when completely inflated, the interior sides I of the center pillar portion CP, the rear pillar portion RP, and the windows W4/W5/W6.

The main portion 112 is provided with a front inflation portion 114 to be inflated to the exterior side of the front seat, and a rear inflation portion 115 to be inflated to the exterior side of the rear seat. Moreover, the main portion 112 is provided with a gas feed passage portion 113, which is arranged in the longitudinal direction of the vehicle V2 along the upper edge 112a of the main portion 112 so as to feed the inflating gas from the inlet port 117 to the front/rear inflation portions 114/115.

In the regions of the front/rear inflation portions 114/115, there are arranged the later-described regulating portions 119. Specifically, each front/rear inflation portion 114/115 is divided into a plurality of vertical cells 114a/115a (FIGS. 27 and 28). These individual vertical cells 114a/115a are inflated so that their longitudinal width is reduced. In other words, the main portion 112 completes its inflation in a manner so as to reduce its longitudinal length size. Therefore, the main portion 112 can establish, when mounted on the vehicle V2, a tension in the longitudinal direction between later-described mounting portions 127A/127B (FIGS. 22 and 27).

The inlet port 117 is arranged at the approximate center of the upper edge 112a in the longitudinal direction of the main portion 112, that is, in the case of the embodiment above the rear end of the front inflation portion 114. The inlet port 117 is formed to protrude upward. The inlet port 117 is provided with a connection portion 117a formed to protrude from the main portion 112, and an inlet port main portion 117b arranged to intersect the connection portion 117a roughly at a right angle. In short, the inlet port 117 is formed generally into an L-shape. The connection portion 117a communicates with the gas feed passage portion 113, extending upward from the gas feed passage portion 113. The inlet port main portion 117b communicates with the connection portion 117a on its vehicular front end. Moreover, the inlet port main portion 117b is opened on its vehicular rear end so as to connect with the inflator 150. The inlet port 117 is mounted on the diffuser 152 of the inflator 150 so that the two gas discharge ports 152a/152a are in the vicinity of the upper part of the connection portion 117a. When the inlet port 117 is mounted on the diffuser 152, moreover, it is connected to the diffuser 152 by fastening a clamp 155 made of sheet metal.

In the case of the first embodiment, moreover, the inlet port 117 is arranged above the center pillar portion CP (as shown in FIGS. 22 and 26).

In the case of the embodiment, moreover, there is arranged in the inlet port 117 a flow regulating fabric 130, as shown in FIGS. 27 and 29. This flow regulating fabric 130 is formed of the fabric remaining after the airbag 110 is hollow-woven. The flow regulating fabric 130 is provided with a horizontal cylinder portion 130a arranged in the inlet port main portion 117b of the inlet port 117, and a vertical cylinder portion 130b extending downward from the vehicular front end of the horizontal cylinder portion 130a. This horizontal cylinder portion 130a is arranged between the inner circumference of the inlet port main portion 117b and the outer circumference of the diffuser 152. In the lower end of the vertical cylinder portion 130b, moreover, gas outlet ports 130c/130d are opened toward the front and rear of the vertical cylinder portion 130b for discharging the inflating gas. The openings of the outlet ports 130c and 130d face directions that are obliqiue with respect to the vertical cylinder portion 130b When the gas outlet ports 130c/130d arranged in the inlet port 117, they extend into the region of the gas feed passage portion 113 of the main portion 112.

Here, the inflating gas G discharged from the gas outlet ports 130c/130d flows into the main portion 112 in the following manner. The inflating gas G flows forward through the gas feed passage portion 113 after colliding with the horizontal rod portions 125a of a regulating portion 125D below the inlet port 117, into the individual vertical cells 14a thereby to inflate the front inflation portion 114. Moreover, the inflating gas G flows backward through the gas feed passage portion 113, after colliding with the horizontal rod portion 125a of the regulating portion 125D, into the rearmost vertical cell 114a of the front inflation portion 114 and the individual vertical cells 115a thereby to inflate the rear inflation portion 115. As a result, the entire inflation of the main portion 112 is completed. Moreover, the airbag 110 has the inlet port 117 at is approximate center in the longitudinal direction so that its front and rear ends can be promptly fed with the inflating gas G and the main portion 112 can be quickly inflated.

The non-inlet portion 119 is provided with a boundary portion 120 at its boundary with the gas receiving portion 111, and a general portion 121 arranged from the boundary portion 120 to the outer periphery of the airbag 110 or in the region of the gas receiving portion 111. The general portion 121 is provided with an outer peripheral edge portion 122, regulating portions 125, a plate portion 126 and mounting portions 127. In the case of the embodiment, the boundary portion 120 is also arranged at the boundary with the gas receiving portion 111, as the regulating portions 125 or the plate portion 126. Moreover, this embodiment is constructed by sewing a cloth member 129 separate of the airbag 110 to the front end side. However, the portion of the cloth member 129 may also be formed by hollow-weaving it integrally with the airbag 110.

The outer peripheral edge portion 122 is arranged on the peripheral edge of the gas receiving portion 111 so as to comprise the outer peripheral edge of the airbag 110. Moreover, in the outer peripheral edge portion 122, the portion near the boundary of the inlet port 117 and the main portion 111, which is positioned at inner side is provided with an inner corner portion 123. In this embodiment, the inner corner portion 123 is indicated with hatched lines in FIG. 27. This inner corner portion 123 is formed more extendible woven texture than that of other portions of the outer peripheral edge portion 122 or other non-inlet portions 119. Moreover, an arc shaped cut-away portion 123a is formed (FIG. 27) in the outer peripheral edge of the inner corner portion 123, in which the inlet port 117 and the main portion 112 intersect each other.

The regulating portions 125 are arranged at a plurality of positions in the regions of the front/rear inflation portions 114/115 extending vertically in straight lines. These regulating portions 125 are provided for allowing the front/rear inflation portions 114/115 to keep their plate shape without unevenly enlarged thickness at the completion of inflation. These regulating portions 125 are formed into a T-shape or an inverted J-shape extending upward either from the outer peripheral edge portion 122 on the lower edge 112b of the main portion 112 or apart from the outer peripheral edge portion 122.

The plate portion 126 is formed into a rectangular plate shape and is arranged at a position between the front/rear inflation portions 114/115 and below the gas feed passage portion 113. This plate portion 126 is provided for reducing the volume of the gas receiving portion 111 and for shortening the time period from the start to the completion of inflation of the main portion 112.

Figure 23:
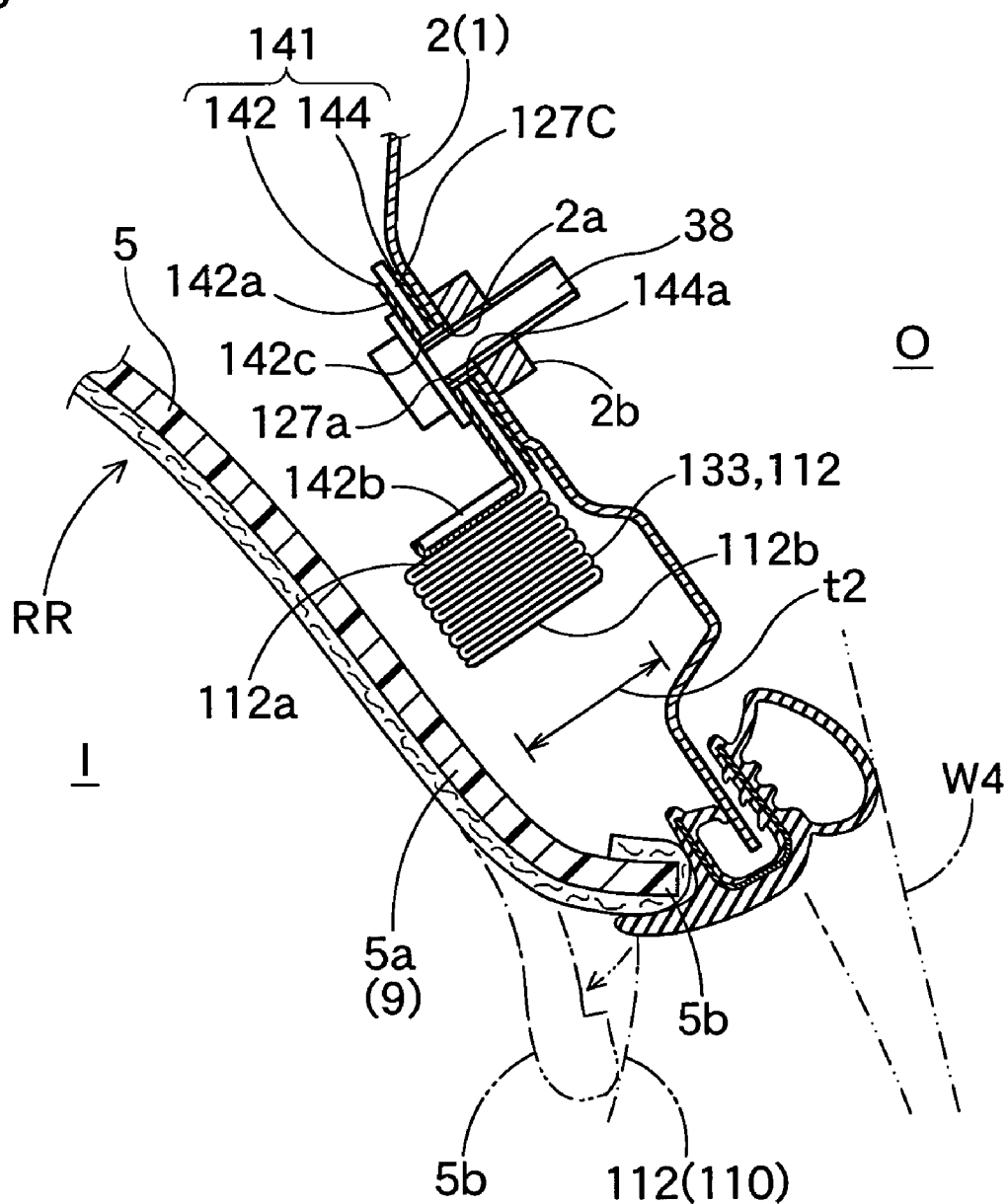
FIG. 23 is an enlarged schematic section of portion XXIII—XXIII of FIG. 22.

The mounting portions 127 are arranged near the upper edge 112a of the main portion 112 when inflated and on the upper edge of the cloth member 129. Each mounting portion 127 is arranged to protrude upward. In the case of the embodiment, the mounting portions 127 are arranged at seven positions. At the center of each mounting portion 127, moreover, there is formed a mounting hole 127a. This mounting hole 127a is formed to insert a mounting bolt 38(FIG. 23). In the case of the embodiment, each mounting hole 127a is formed by boring the airbag 110 after this airbag 110 is hollow-woven.

Figure 34:
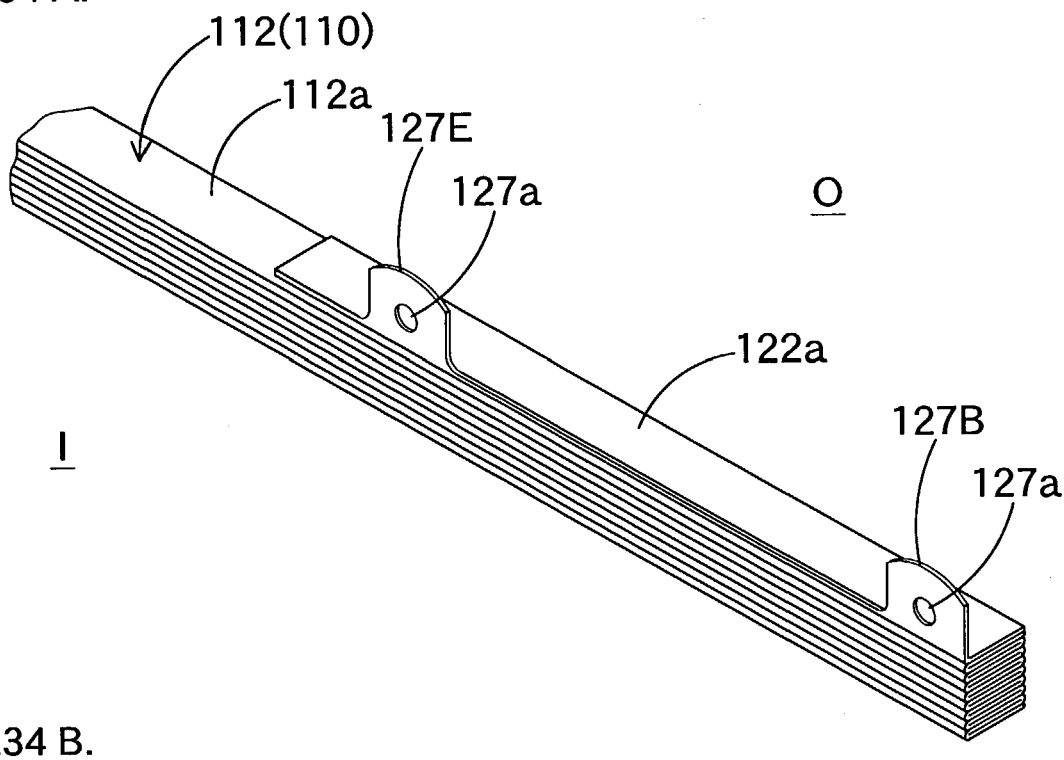
FIG. 34A and FIG. 34B are explanatory views showing the formation of a twisted portion in an airbag of the third embodiment.
Figure 34:
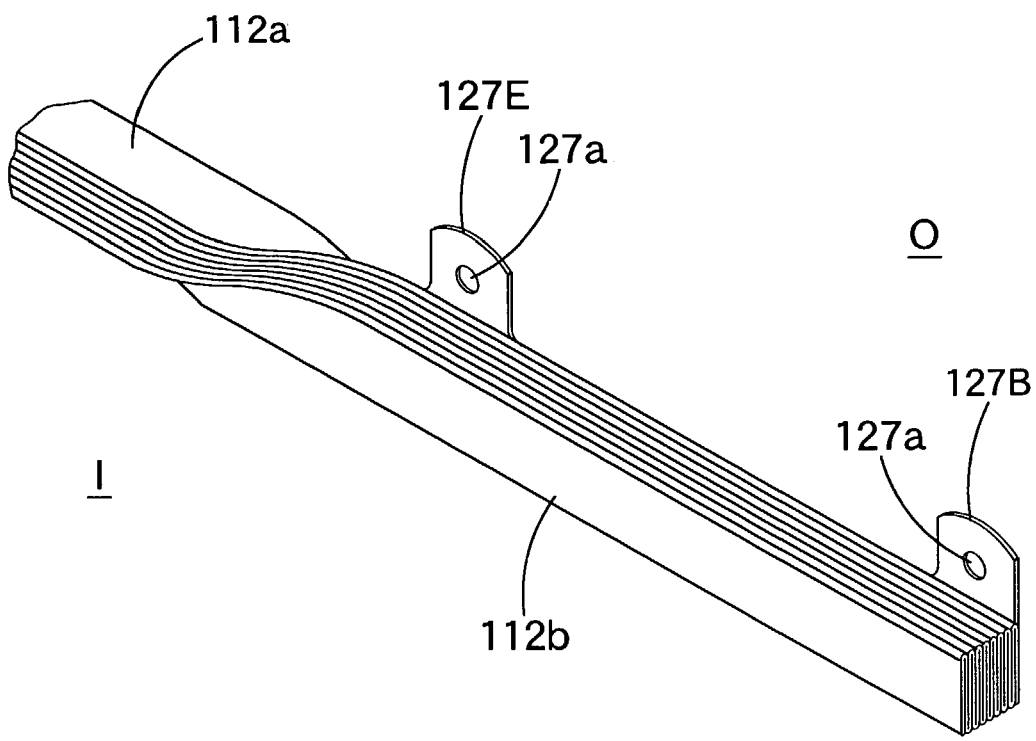

In the case of the embodiment, moreover, at the outer peripheral edge portion 122 on the upper edge 112a of the main portion 112, there are formed an extension 122a located at a portion near the mounting portion 127E positioned above the rear pillar portion RP and the mounting portion 127B at the rear end, as shown in FIGS. 27 and 29. These mounting portions 127E and 127B are formed to protrude upward from the extension 122a. As shown in FIGS. 34A and 34B, this extension 122a is formed so that if a twisted portion 135 is provided in the folded main portion 112, the mounting portions 127E/127B positioned in the twisted portion 135 may be mounted at a height like that of the remaining mounting portions 127 on the inner panel 2. In the case of the embodiment, the vertical width t1 of the extension 122a is set to be substantially equal to the width t2 of folds of the main portion 112 (FIGS. 23 and 29).

Figure 30:
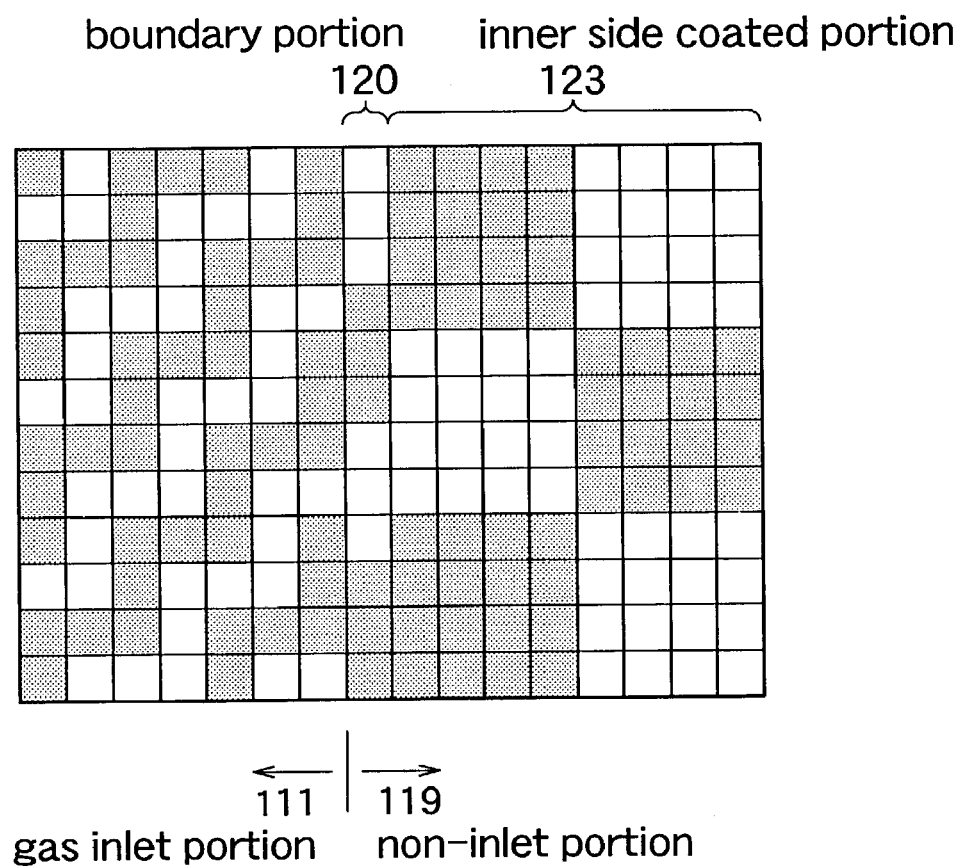
FIG. 30 is a schematic view showing a portion of a woven texture in the airbag of the third embodiment.
Figure 31:
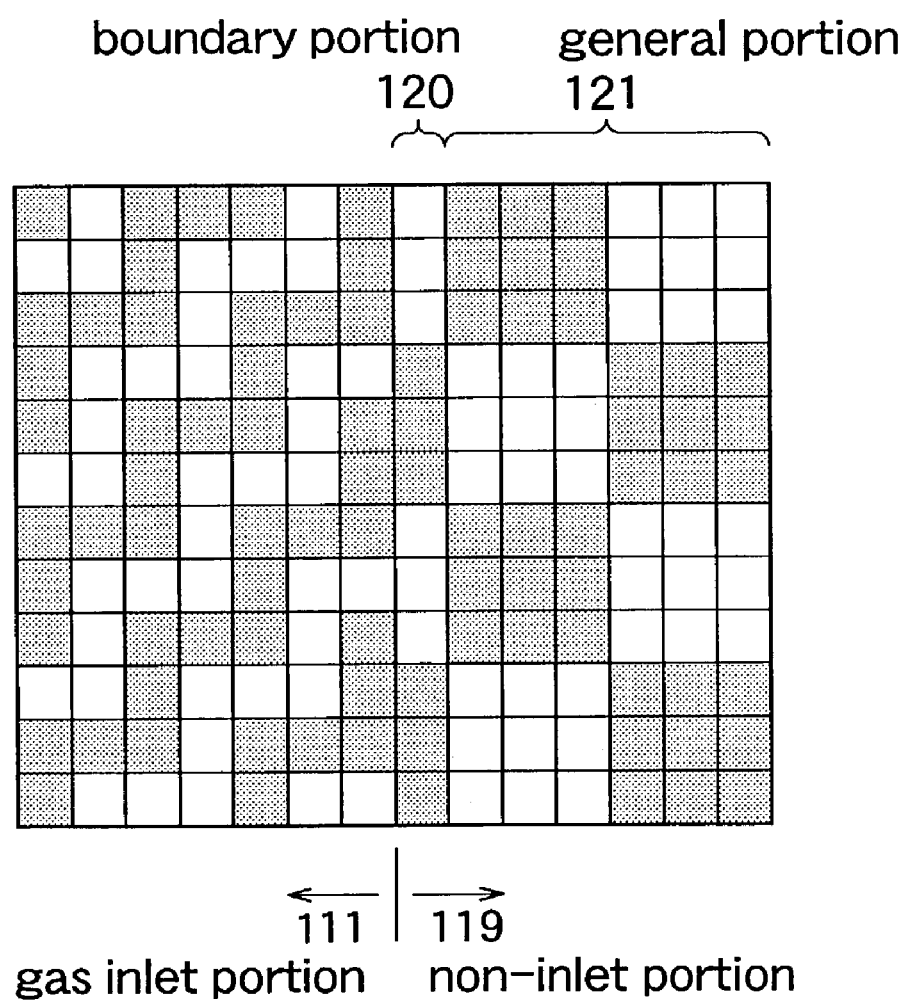
FIG. 31 is a schematic view showing a portion of the woven texture in the airbag of the third embodiment.

Next, the hollow-woven texture of the airbag 110 in the case of the third embodiment will be described. At the gas receiving portion 111, the interior side wall portion 111a and the exterior side wall portion 111b are plain-woven 1×1. At the non-inlet portion 119, as shown in FIG. 31, the boundary portion 120 is basket-woven 1×3, and the general portions 121 other than the inner corner portion 123 is 3×3 basket-woven. At the portion of the inner corner portion 123, as shown in FIG. 30, the boundary portion 120 is basket-woven 1×3, and the portion of the inner corner portion 123 is basket-woven 4×4 so that it may be more extendible than the general portion 121.

Moreover, a coating agent such as (not-shown) silicone is applied to the outer surface side after the airbag 110 is hollow-woven so as to improve the heat resistance of the airbag 110 and to prevent leakage of the inflating gas.

On the mounting portions 127, as shown in FIGS. 22 and 23, there are fixed the mounting brackets 141/37, which are made of a sheet metal. These mounting brackets 141/37 mount the folded main portion 112 firmly on the inner panel 2 on the side of the body 1. When the mounting bolts 38 are inserted, moreover, the mounting brackets 141/37 are fastened together with the mounting portions 127 on the inner pane 12. The mounting bracket 141 is fixed on the mounting portion 127C, which is located in the vicinity of the boundary portion between an untwisted portion 133 and a twisted portion 134 in the folded main portion 112. In the case of the embodiment, the mounting portion 127C is arranged on the front end side of the inlet port 117. In the case of the embodiment, moreover, the mounting bracket 141 is also fixed on a mounting portion 127D, which is arranged on the upper side of the plate portion 126. The mounting brackets 37 are fixed on the remaining mounting portions 127 (127A/127B/127E). Here, the mounting bracket 37 has a construction similar to that of the aforementioned airbag device M1, and its description will be omitted by designating it by the same reference numeral.

Each mounting bracket 141 is made of a sheet metal and has an inner plate 142 arranged on the interior side I of each mounting portion 127C/127D, and an outer plate 144 arranged on the exterior side O of each mounting portion 127C/127D. The inner plate 142 and the outer plate 144 are mounted on each mounting portion 127C/127D while clamping each mounting portion 127C/127D. These inner plates 142 and outer plates 144 are caulked at predetermined portions while clamping each mounting portion 127C/127D so that they are mounted in an integrated state on the mounting portion 127C/127D and thus on the inner panel 2.

As shown in FIG. 23, the inner plate 142 is provided with a vertical wall portion 142a for covering the interior side I of the mounting portion 127C/127D, and a horizontal wall portion 142b protruding to the interior side I from the lower end of the vertical wall portion 142a. In this vertical wall portion 142a, there is formed a mounting hole 142c, which corresponds to the mounting hole 127a of the mounting portion 127C/127D. The horizontal wall portion 142b is arranged to abut against the upper face side of the folded main portion 112. In the case of the embodiment, moreover, the horizontal wall portion 142b is set to have a larger longitudinal width than that of the vertical wall portion 142a, as shown in FIG. 26. The horizontal wall portion 142b protrudes more to the front side than the vertical wall portion 142a when the airbag 110 is mounted on the vehicle V2. This horizontal wall portion 142b keeps the folded main portion 112 in the untwisted state. Specifically, the boundary portion between the untwisted portion 133 and the twisted portion 134 is restrained on its upper side by the horizontal wall portion 142b. Therefore, the twisted state does not propagate to the untwisted portion 133 so that the main portion 112 can be maintained in the twisted state and in the untwisted state at the proper places. Moreover, the mounting bracket 141 is also fixed on the mounting portion 127D, which is arranged on the upper edge of the window W5 near its center, as shown in FIG. 22. This mounting bracket 141 is arranged so that the folded main portion 112 may be prevented, when the airbag 110 is mounted on the vehicle, by the horizontal wall portion 142b of the inner plate 142 from unintentionally riding on the mounting portion of a (not-shown) assist grip arranged near that portion.

The outer plate 144 is formed to have a contour generally identical to that of the vertical wall portion 142a of the inner plate 142, and is provided with a mounting hole 144a corresponding to the mounting hole 127a of the mounting portion 127C/127D.

When the airbag 110 is mounted in the folded state on the vehicle V2, it is partially twisted to have the twisted portions 134/135 at the portions of the inflator 150, that is, at the position above the center pillar portion CP, and from above the rear pillar portion RP to the rear of the rear pillar portion RP, as shown in FIG. 22. In the case of the embodiment, the clamps 34/35 are so assembled with the twisted portions 134/135 that these portions 134/135 may not become untwisted. The clamps 34/35 are given a construction similar to that of the foregoing airbag device M1, and its description will be omitted by designating them by the common reference numerals.

These twisted portions 134/135 are so provided as to protrude to the interior side I while preventing the airbag 110 (or its main portion 112) folded in a bellows from being hooked, when inflated, by the upper ends 106a/107a of the garnishes 106/107. Specifically, each twisted portion 134/135 is so twisted unlike the untwisted portions 133 positioned above the remaining portions positioned above the window W4/W5 that the upper edge 112a of the main portion 112 when flatly expanded which is on the upstream side of the inflating gas flowing into the main portion 112 may be positioned on the exterior side O whereas the side of the lower edge 112b of the main portion 112 when flatly expanded which is on the downstream side of the inflating gas may be positioned on the interior side I. When the gas feed passage portion 113 on the side of the upper edge 112a is inflated by the inflating gas admitted, therefore, the side of the upper edge 112a is scarcely moved at all, but the side of the lower edge 112b is pushed toward the interior side I. This is because the upper edge 112a is fixed on the side of the body 1 by the mounting portions 127. And the lower edge 112b is not caught by the upper ends 106a/107a of the garnishes 106/107 so that the main portion 112 can protrude to the interior side I. Here in the untwisted portion 133 in the folded main portion 112, as shown in FIG. 23, the side of the lower edge 112b is arranged below the upper edge 112a and slightly more toward the exterior side O than the upper edge 112a.

Moreover, the extension 122a in the airbag 110 is folded, with the main portion 112 being folded, toward the interior side I, as shown in FIG. 34A. Next, the portion 135 is twisted to face the lower edge 112b of the main portion 112 toward the interior side I. As a result, the main portion 112 can be arranged to have the mounting portions 127E/127B located at the same height position as that of the other mounting portion 127, as shown in FIG. 34B. Here in the portion of the twisted portion 134, the inlet port 117 is arranged to perform an action like that of the extension 122a.

Figure 32:
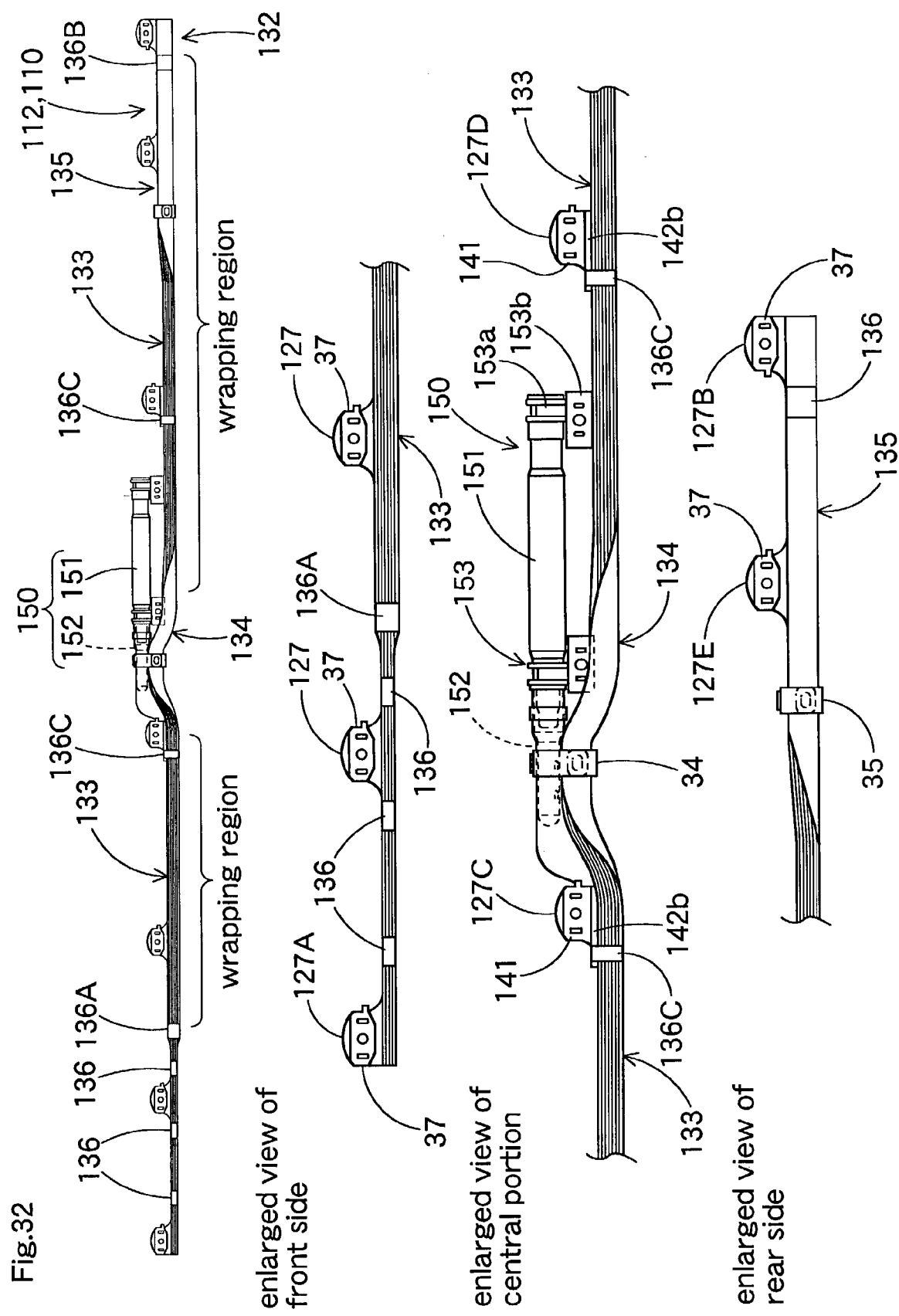
FIG. 32 is a front elevation showing an airbag assembly in the state where it is mounted on the vehicle, according to the airbag device of the third embodiment.
Figure 33:
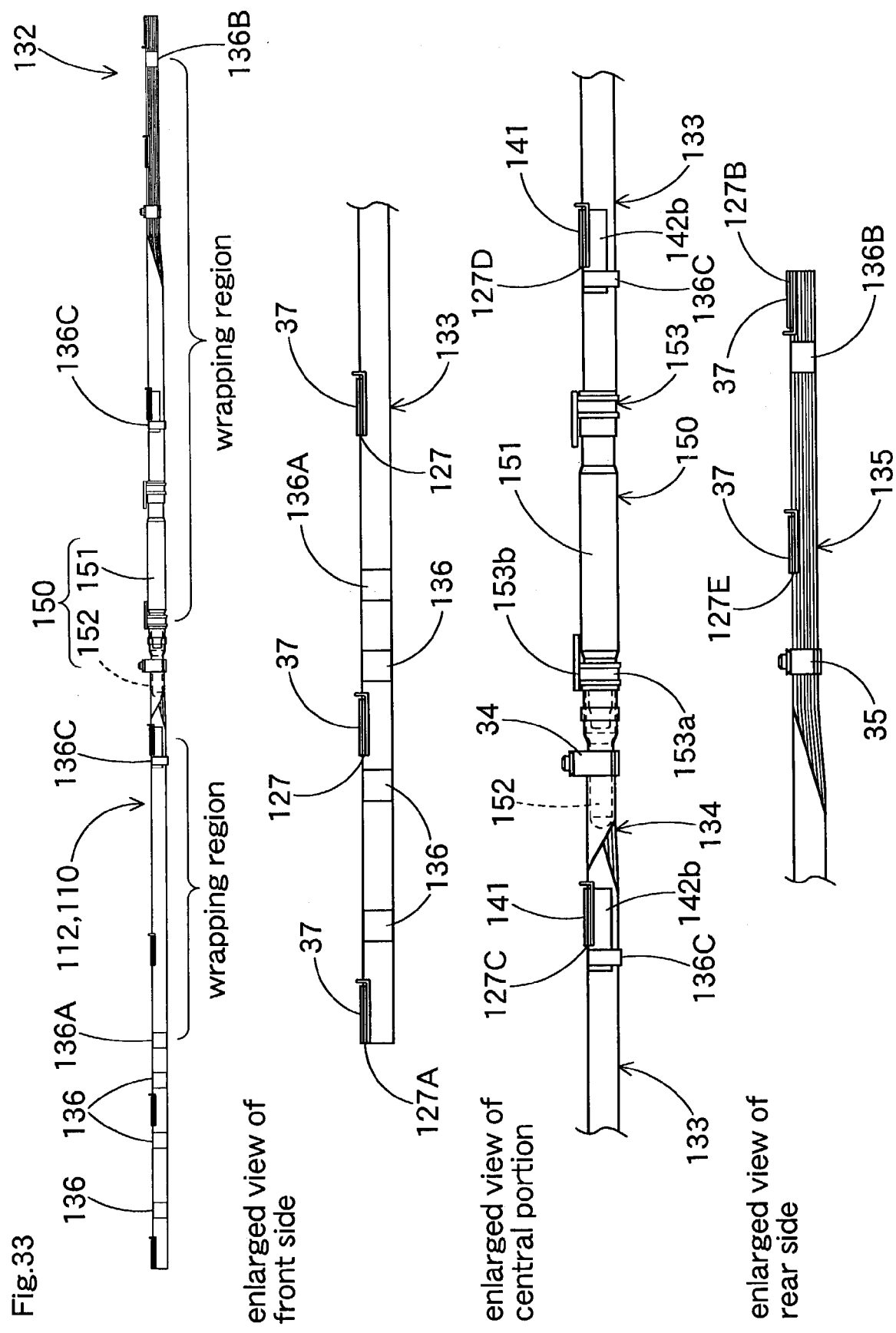
FIG. 33 is a top plan view showing the airbag assembly of the state, in which the airbag device of the third embodiment is mounted on the vehicle.

Here will be described how to assemble the head protecting airbag device M3 of the third embodiment. First of all, the flow regulating fabric 130 is inserted into the inlet port 117 in the airbag 110, and the airbag 110 is folded up. As shown in FIGS. 23 to 25 and 27, the airbag 110 is folded into such a bellows shape from the uninflated but extended flat state that the main portion 112 is piled up in a generally vertical direction. Specifically, the airbag 110 is so folded in the bellows shape with creases C parallel to the upper edge 112a that the lower edge 112b comes close to the upper edge 112a. After being folded, moreover, the airbag 110 is wrapped with the not-shown wrapping member. Here in the case of the embodiment, the airbag 110 folded is braided and wrapped with the not-shown wrapping string. The wrapped portions are located on the front and the rear of the inlet port 117, as shown in FIGS. 32 and 33. Here, the airbag assembly 132, as shown in FIGS. 32 and 33 is mounted on the vehicle so that the twisted portions 134/135 are not formed in the folded airbag 110. The twisted portion 134 is formed at the time when the clamp 34 is mounted. The twisted portion 135 is formed at the time when the airbag assembly 132 is mounted on the inner panel 2.

The front end portion and the rear end portion of the wrapping portion is wound with a breakable tape member 136 for preventing the wrapping string from being unbraided. In other words, the two areas from the tape member 136A to the mounting portion 127C and from the vicinity of the rear end of the inlet port 117 to the tape member 136B are braided with the wrapping string. Here, the thinly folded portion of the airbag 110 is also braided with the tape member 136.

After the folded airbag 110 (or the main portion 112) was wrapped, moreover, the individual mounting portions 127 are pulled out, and the mounting brackets 141/37 are mounted on the mounting portions 127. And, a tape member 136C is wrapped on the protruding portions of the horizontal wall portion 142b in the inner plate 142 of the mounting bracket 141. This wrapping is done to enhance the regulating effect of the horizontal wall portion 142b and maintain the untwisted state of the folded main portion 112 properly. After this, the diffuser 152 of the inflator 150 is inserted into inlet port body 117b of the inlet port 117 and the horizontal cylinder portion 130a of the flow regulating fabric 130, and the inlet port 117 and the diffuser 152 are connected by the clamp 155. Here, the diffuser 152 and the mounting bracket 153 are assembled in advance with the main portion 151 of the inflator 150.

Next, the folded airbag 110 is twisted so that the lower edge 112b of the main portion 110 faces toward the interior side I thereby to form the twisted portion 134, and the clamp 34 is fitted on the twisted portion 134. And, the clamp 35 is fitted on that portion of the folded main portion 112, at which the twisted portion 135 is to be formed. Thus, the airbag assembly 132 can be formed, as shown in FIGS. 32 and 33. As has been described hereinbefore, however, the twisted portion 135 is not formed when the airbag assembly 132 is formed.

And, the airbag assembly 132 can be mounted on the body 1 like the airbag assembly 30 in the aforementioned airbag device M1 (See FIG. 6). At the time of mounting a mounting bracket 141 on the inner panel 2, the mounting portions 127E/127B to be arranged at the portion of the twisted portion 135 are mounted on the inner panel 2 by means of the mounting brackets 37 and the mounting bolts 38, so that the twisted portion 135 with the side of the lower edge 112b facing toward the interior side I is formed. In the state of the airbag assembly 132 before being mounted on the inner panel 2, more specifically, the mounting portions 127E/127B are positioned on the interior side I of the folded main portion 112, as shown in FIG. 34A. And, these mounting portions 127E/127B are positioned, when they are fixed on the inner panel 2, on the exterior side O of the folded main portion 112. At this time, the main portion 112 at this position is twisted, as the mounting portions 127E/127B move, so that the lower edge 112b faces toward the interior side I. As a result, the threaded portion 135 is formed (FIG. 34B). After this, the not-shown lead wires extending from a control device for the predetermined inflator actions are connected with the inflator 150, and the front pillar garnish 4 and the roof head lining 5 are mounted on the body 1. Moreover, the center pillar garnish 106 and the rear pillar garnish 107 are mounted on the body 1. Thus, the head protecting airbag device M3 can be mounted on the vehicle V2.

If the inflator 150 is activated after the airbag device M3 was mounted on the vehicle V2, the inflating gas is discharged from the individual gas discharge ports 152a of the diffuser 152. Then, the inflating gas is fed to the gas feed passage portion 113 through the connection portion 117a of the inlet port 117 (or the vertical cylinder portion 130b of the flow regulating fabric 130) and further through the gas outlet ports 130c/130d. Moreover, the inflating gas flows into the individual vertical cells 114a/115a of the front/rear inflation portions 114/115 so that the main portion 112 of the airbag 110 begins to be inflated while being unfolded. Then, the main portion 112 breaks the wrapping string (not shown) and the tape members 136, and pushes open the interior side portions 34a/35a of the clamps 34/35 toward the interior. Moreover, the main portion 112 pushes open the lids 4a/5a of the front pillar garnish 4 and the roof head lining 5. After this, the main portion 112 is inflated so as to cover the interior side I of the windows W4/W5/W6, the center pillar portion CP, and the rear pillar portion RP, as indicated by double-dotted lines in FIGS. 22 to 25.

In the airbag 110 of the airbag device M3 of the third embodiment, moreover, the inner corner portion 123 in the outer peripheral edge portion 122, which receives tension in the expanding direction when the airbag 110 is inflated, is so basket-woven 4×4 that it may be more extendible than the general portion 121. Even if a stress concentration occurs at that portion when the airbag 110 is inflated, therefore, the inner corner portion 123 itself extends so that it scarcely receives any damage. In the airbag 110 of the airbag device M3 of the third embodiment, moreover, the outer peripheral edge portion 122 is not wholly formed of an extendible woven texture. Therefore, the remaining general portion 121 is scarcely extended at all, so that the shape of the airbag 110 having completed its inflation can be made like that of the related art thereby and cover the predetermined protective area. At the same time, moreover, a tension in the longitudinal direction can be established between the mounting portions 127A and 127B in the completely inflated main portion 112.

Therefore, the airbag 110 of the third embodiment hardly receives any damage and can be smoothly inflated even if the stress concentration occurs when it is inflated.

Moreover, the airbag 110 of the third embodiment is provided with the inlet port 117 to be fixed together with the inflator 150 on the body 1, and the main portion 112 to be inflated by admitting the inflating gas from the inlet port 117. And, the inlet port 117 includes the connection portion 117a formed to protrude from the main portion 112, and the inlet port main portion 117b to be arranged to intersect the connection portion 117a generally at a right angle. In the airbag 110 of the third embodiment, more specifically, the inlet port 117 is formed generally in an L-shape to protrude from the main portion 112. In the airbag 110 of the construction of the third embodiment, moreover, a high stress is easily concentrated at the boundary portion between the inlet port 117 to be fixed on the side of the body 1 and the gas receiving main portion 112 to be inflated toward the interior space. Especially in the case of the airbag 110 of the third embodiment, the portion near the inlet port 117 is formed into the twisted portion 134 making the side of the lower edge 112b face toward the interior side I. When the airbag 110 is inflated, therefore, the inner corner portion 123 is greatly pulled not only downward but also toward the interior side I, so that a higher stress is easily concentrated. In the airbag 110 of the third embodiment, however, the inner corner portion 123, which is formed of a woven texture more extendible than that of the remaining general portion 121, is arranged at the boundary portion between the inlet port 117 and the main portion 112. As a result, the stress can be absorbed, even if concentrated, due to the cushioning properties of the inner corner portion 123.

In the airbag 110 of the third embodiment, moreover, the generally arc shaped cut-away portion 123a is formed in the recessed outer peripheral edge of the inner corner portion 123. Even if a stress in the expanding direction acts on the portion of the inner corner portion 123 when the airbag 110 is inflated, therefore, the actual film length of the inner corner portion 123 can be enlarged by that cut-away portion and so suppress the stress concentration.

Here in the airbag 110 of the third embodiment, the whole portion of the inner corner portion 123 is basket-woven by 4×4, but the woven texture of the inner corner portion 123 should not be limited thereto. In case the portion of the inner corner portion 123 is halved into inner and outer peripheral portions, for example, it is acceptable that only the half portion on the inner peripheral side is basket-woven by 4×4 whereas the remaining half portion on the outer peripheral side is 3×3 basket-woven.

Moreover, the third embodiment has been described for the case, in which the airbag according to the invention is exemplified by the airbag 110 of the head protecting airbag device M3. However, the airbag, to which the invention can be applied, should not be limited thereto. The invention could be applied to the airbag which is used in a side collision airbag device or the like mounted on a seat.

What is claimed is:

1. A head protecting airbag device in a vechicle comprising:
    an airbag folded and housed above an intermediate pillar portion arranged between a front pillar portion and a rear pillar portion of a vehicle, for covering, when inflated, the interior side of said intermediate pillar portion and windows to the front and rear of said intermediate pillar portion; and
    a gas feeder member formed in a rigid rod member to be arranged in the longitudinal direction of the vehicle, and having a gas discharge port formed near one end for discharging airbag inflating gas,
    wherein said airbag includes: a main portion having a gas receiving portion to be inflated by admitting the inflating gas; an inlet port connected to said gas feeder member; and a plurality of mounting portions for mounting said airbag to a body of the vechicle,
    wherein said main portion can cover, when completely inflated, the interior side of said intermediate pillar portion and said windows,
    wherein said inlet port is arranged above said intermediate pillar portion and on the upper edge of said main portion when it is inflated, protruding upward so as to introduce the inflating gas downward into said gas receiving portion,
    wherein said mounting portions are arranged by the upper edge of said main portion when it is inflated, protruding upward,
    wherein said mounting portions in said airbag include a vicinity mounting portion arranged close to said inlet port, and other general mounting portions,
    wherein a downward recess is formed between said vicinity mounting portion and said inlet port, and
    wherein said recess substantially can enlarge the length of the outer peripheral edge of said vicinity mounting portion facing said inlet port and the outer peripheral edge of said inlet port facing said vicinity mounting portion, thereby to increase the possible separation of said vicinity mounting portion and said inlet port apart from each other.

2. A head protecting airbag device comprising:
    an airbag folded and housed above an intermediate pillar portion arranged between a front pillar portion and a rear pillar portion of a vehicle, for covering, when inflated, the interior side of said intermediate pillar portion and windows to the front and rear of said intermediate pillar portion; and
    a gas feeder member formed in a rigid rod member to be arranged in the longitudinal direction of the vehicle, and having a gas discharge port formed near one end for discharging airbag inflating gas,
    wherein said airbag includes: a main portion having a gas receiving portion to be inflated by admitting the inflating gas; an inlet port connected to said gas feeder member; and a plurality of mounting portions for mounting said airbag to a body of the vehicle,
    wherein said main portion can cover, when completely inflated, the interior side of said intermediate pillar portion and said windows,
    wherein said inlet port is arranged above said intermediate pillar portion and on the upper edge of said main portion inflated, protruding upward so as to introduce the inflating gas downward into said gas receiving portion,
    wherein said mounting portions are so arranged on the side of the upper edge of said main portion inflated, as to protrude upward,
    wherein said mounting portions in said airbag include a vicinity mounting portion arranged adjacent to said inlet port, and other general mounting portions, and wherein an edge of the vicinity mounting portion nearest to the inlet port and an edge of the inlet port nearest to the vicinity mounting portion are both located in an area that is directly above the intermediate pillar portion, and wherein said vicinity mounting portion, said inlet port and said gas feeder member are offset from the center of the intermediate pillar portion in the longitudinal direction of the vehicle.

3. An hollow-woven airbag folded and housed in a vehicle for being inflated by admitting inflating gas from an inflator, comprising:

a gas receiving portion, two wall portions of which are constructed to seperate from each other by admitting the inflating gas; and a non-inlet portion constructed by joining the two wall portions, allowing no inflating gas to pass, wherein said non-inlet portion comprises the outer peripheral edge of said airbag arranged on the peripheral edge of said gas receiving portion, wherein said outer peripheral edge portion includes an inner corner portion having a recessed shape for receiving tension in a expanding direction when said airbag is inflated, and wherein said inner corner portion is formed of a woven texture by which it is more extendible than the other portions of said outer peripheral edge portion.

4. An airbag according to claim 3, wherein said gas receiving portion includes an inlet port fixed on a body of the vehicle, and a main portion which is inflated by admitting the inflating gas from said inlet port, and wherein said inner corner portion is arranged at a boundary portion between said inlet port and said main portion.

5. An airbag according to claim 4, wherein said inlet port is formed to bend as it protrudes from said main portion, and wherein said inner corner portion is arranged on the inner peripheral side of the bent portion.

6. An airbag according to claim 3, wherein a generally arc shaped cut-away portion is formed in the recessed outer peripheral edge in said inner corner portion.

* * * * *